US012646152B2

(12) United States Patent
Takahashi et al.

(10) Patent No.: US 12,646,152 B2
(45) Date of Patent: Jun. 2, 2026

(54) IMAGE PROCESSING PROGRAM, DEVICE, AND METHOD FOR ANONYMIZATION AND ADAPTIVE RE-MANIPULATION BASED ON RECONSTRUCTION ANALYSIS

(71) Applicants: Fujitsu Limited, Kawasaki (JP); Inter-University Research Institute Corporation Research Organization of Information and Systems, Tachikawa (JP)

(72) Inventors: Jun Takahashi, Kawasaki (JP); Mingxie Zheng, Kawasaki (JP); Toshiyuki Yoshitake, Kawasaki (JP); Masayoshi Shimizu, Hadano (JP); Isao Echizen, Chiyoda (JP)

(73) Assignees: Fujitsu Limited, Kawasaki (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 317 days.

(21) Appl. No.: 18/326,643

(22) Filed: May 31, 2023

(65) Prior Publication Data

US 2024/0046424 A1    Feb. 8, 2024

(30) Foreign Application Priority Data

Aug. 4, 2022    (JP) ................................. 2022-124845

(51) Int. Cl.
*G06T 5/70* (2024.01)
*G06T 3/4053* (2024.01)
(Continued)

(52) U.S. Cl.
CPC .............. *G06T 5/70* (2024.01); *G06T 3/4053* (2013.01); *G06V 10/44* (2022.01); *G06V 10/761* (2022.01)

(58) Field of Classification Search
None
See application file for complete search history.

(56) References Cited

U.S. PATENT DOCUMENTS

2004/0133547 A1    7/2004  Doi
2009/0112872 A1    4/2009  Doi
(Continued)

FOREIGN PATENT DOCUMENTS

CN           114550249  A  *  5/2022  ........... G06F 18/241
JP         2004-145483  A     5/2004
(Continued)

OTHER PUBLICATIONS

Wheeler et al., "Sensor modeling, probabilistic hypothesis generation, and robust localization for object recognition," Proceedings of 1994 IEEE 2nd CAD-Based Vision Workshop, Champion, PA, USA, 1994, pp. 46-53, doi: 10.1109/CADVIS.1994.284517 (Year: 1994).*

(Continued)

*Primary Examiner* — Michelle M Koeth
(74) *Attorney, Agent, or Firm* — ArentFox Schiff LLP

(57) ABSTRACT

An image processing device includes a processor that executes a procedure. The procedure includes: generating a manipulated image by executing first manipulation processing on an input image so as to anonymize information contained in the input image; generating a reconstructed image by performing reconstruction processing on the manipulated image to reconstruct the information; and, based on a comparison between the input image and the reconstructed image, determining whether or not to execute (Continued)

second manipulation processing on the input image or on the manipulated image to anonymize the information, wherein the second manipulation processing is different from the first manipulation processing.

15 Claims, 19 Drawing Sheets

(51) Int. Cl.
  *G06V 10/44*        (2022.01)
  *G06V 10/74*        (2022.01)

(56)                References Cited

U.S. PATENT DOCUMENTS

| | | | |
|---|---|---|---|
| 2010/0235922 | A1 | 9/2010 | Tsusaka et al. |
| 2017/0316542 | A1* | 11/2017 | Shibata ..................... G06T 5/70 |
| 2023/0027783 | A1* | 1/2023 | Kuta ................... G06F 21/6254 |

FOREIGN PATENT DOCUMENTS

| | | | |
|---|---|---|---|
| JP | 2017-046196 | A | 3/2017 |
| JP | 2020-091770 | A1 | 6/2020 |
| WO | WO 2007/122914 | A1 | 11/2007 |
| WO | WO 2019/168144 | A1 | 9/2019 |

OTHER PUBLICATIONS

Machine English Language translation of CN 114550249A, the original publication having a publication date of May 27, 2022 (Year: 2022).*

* cited by examiner

INPUT IMAGE

ANONYMIZED IMAGE

FIG.2

| IMAGE ID | PERSON ID | AREA INFORMATION |
|----------|-----------|------------------|
| AAA | XXX | (100, 200), (300, 500) |
| AAA | YYY | (400, 600), (600, 800) |
| ... | | |

| TYPE OF MANIPULATION | STRENGTH |
|---|---|
| PIXELATION | 3 |
| BLURRING | 5 |
| ... | |

Figure 5:
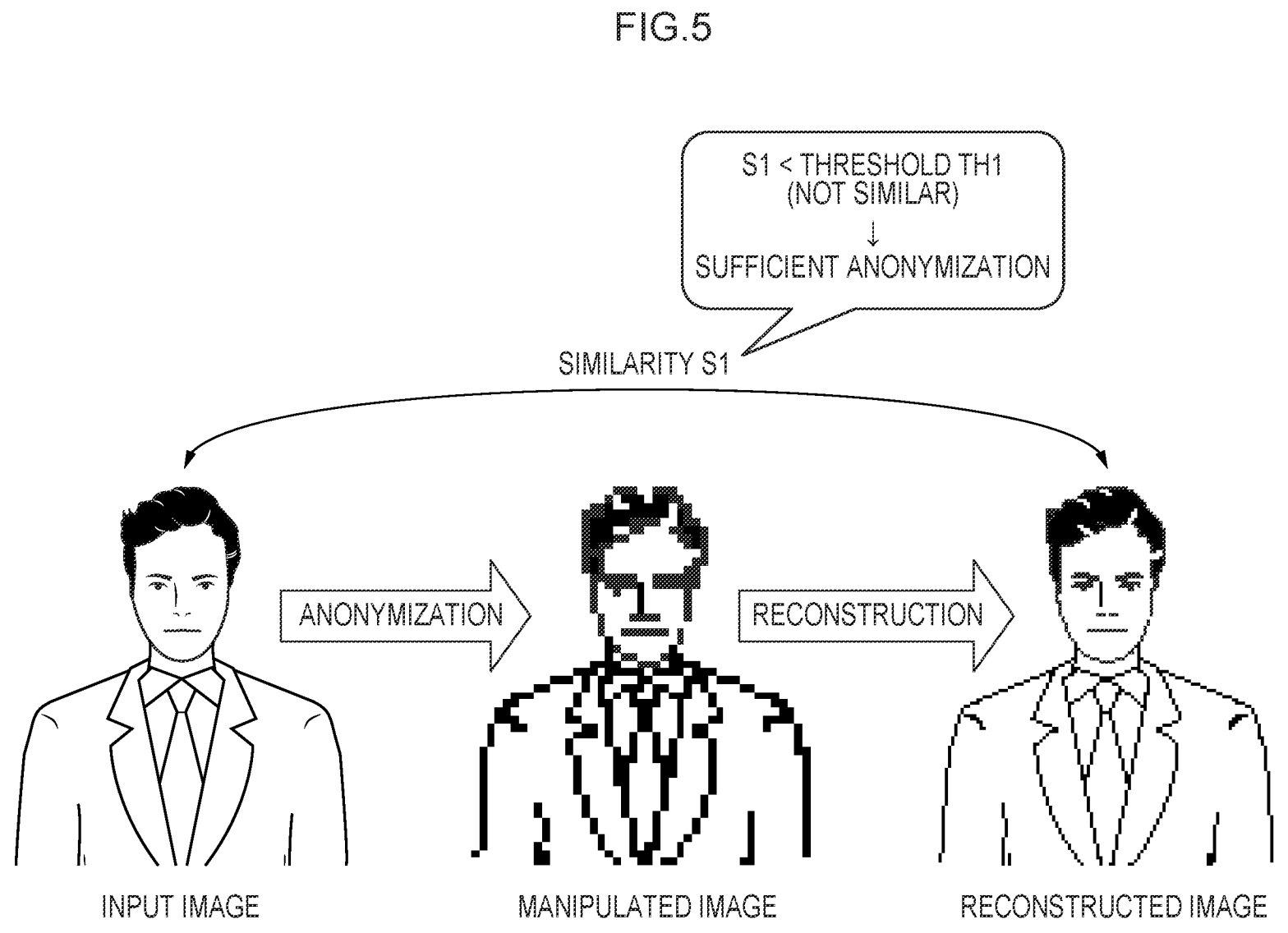

S1 < THRESHOLD TH1
(NOT SIMILAR)
→
SUFFICIENT ANONYMIZATION

SIMILARITY S1

ANONYMIZATION

RECONSTRUCTION

INPUT IMAGE

MANIPULATED IMAGE

RECONSTRUCTED IMAGE

| TYPE OF MANIPULATION | STRENGTH |
| --- | --- |
| PIXELATE | 3 |
| BLUR | 5 |
| ... | |

21

| TYPE OF MANIPULATION | STRENGTH |
| --- | --- |
| PIXELATE | 4 |
| BLUR | 6 |
| ... | |

Figure 7:
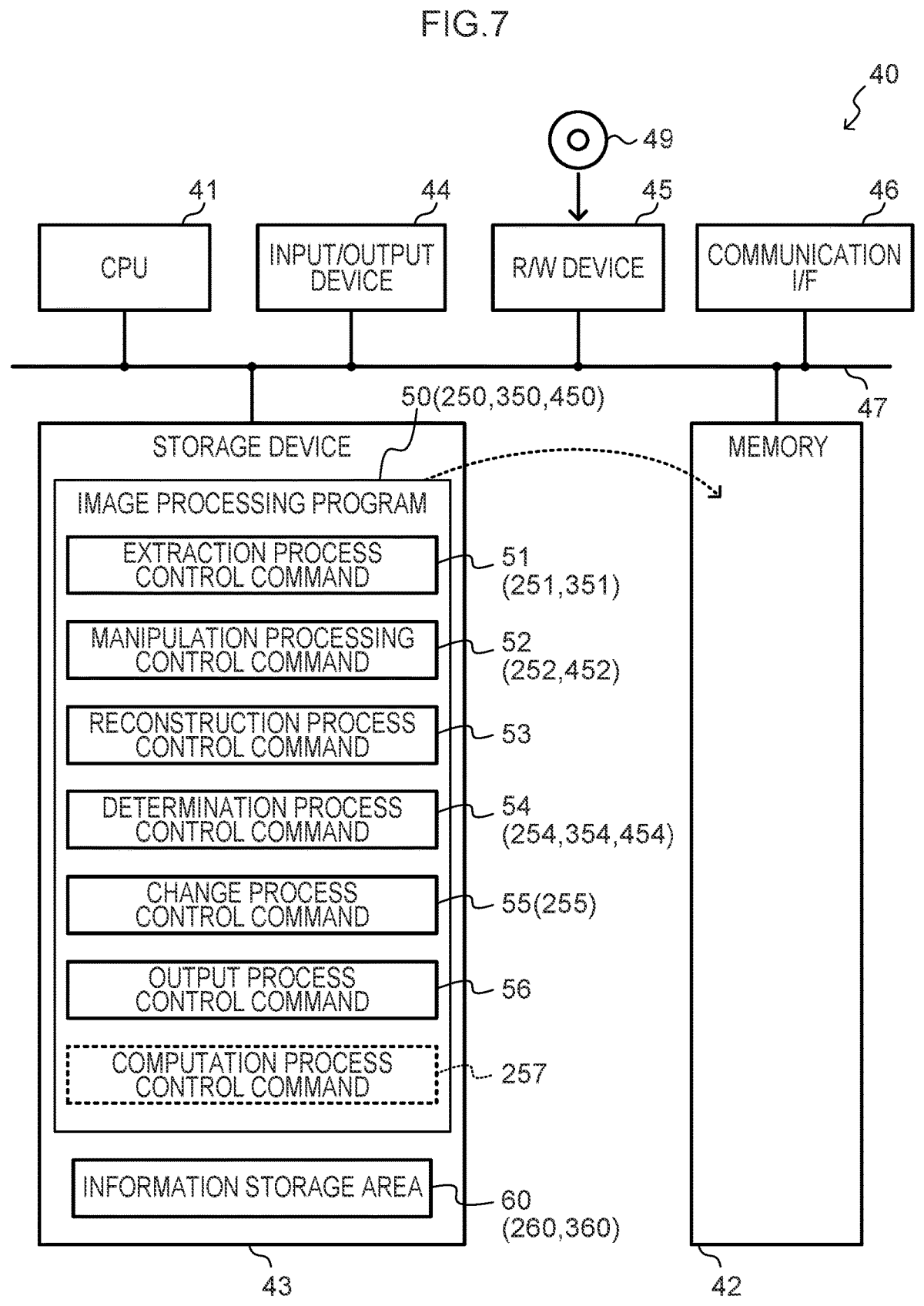

| 41 | 44 | 45 | 46 |
|---|---|---|---|
| CPU | INPUT/OUTPUT DEVICE | R/W DEVICE | COMMUNICATION I/F |

47

50(250,350,450)

STORAGE DEVICE

MEMORY

IMAGE PROCESSING PROGRAM

| EXTRACTION PROCESS CONTROL COMMAND | 51 (251,351) |
| MANIPULATION PROCESSING CONTROL COMMAND | 52 (252,452) |
| RECONSTRUCTION PROCESS CONTROL COMMAND | 53 |
| DETERMINATION PROCESS CONTROL COMMAND | 54 (254,354,454) |
| CHANGE PROCESS CONTROL COMMAND | 55(255) |
| OUTPUT PROCESS CONTROL COMMAND | 56 |
| COMPUTATION PROCESS CONTROL COMMAND | 257 |

| INFORMATION STORAGE AREA | 60 (260,360) |

| PERSON ID | PREDICTED AGE | HAIR COLOR | WEARS GLASSES? | . . . |
|-----------|---------------|------------|----------------|-------|
| XXX | TWENTIES | BLACK | NO | |
| YYY | THIRTIES | BROWN | YES | |
| . . . | | | | |

222B

| ATTRIBUTE INFORMATION | ATTRIBUTE VALUE | PROBABILITY (CORRESPONDENCE NUMBER/ TOTAL NUMBER) |
|------------------------|-----------------|----------------------------------------------------|
| PREDICTED AGE | TWENTIES | 20% |
| | THIRTIES | 30% |
| | . . . | |
| HAIR COLOR | BLACK | 90% |
| | BROWN | 8% |
| | . . . | |
| WEARS GLASSES? | YES | 40% |
| | NO | 60% |
| . . . | | |

Figure 12:
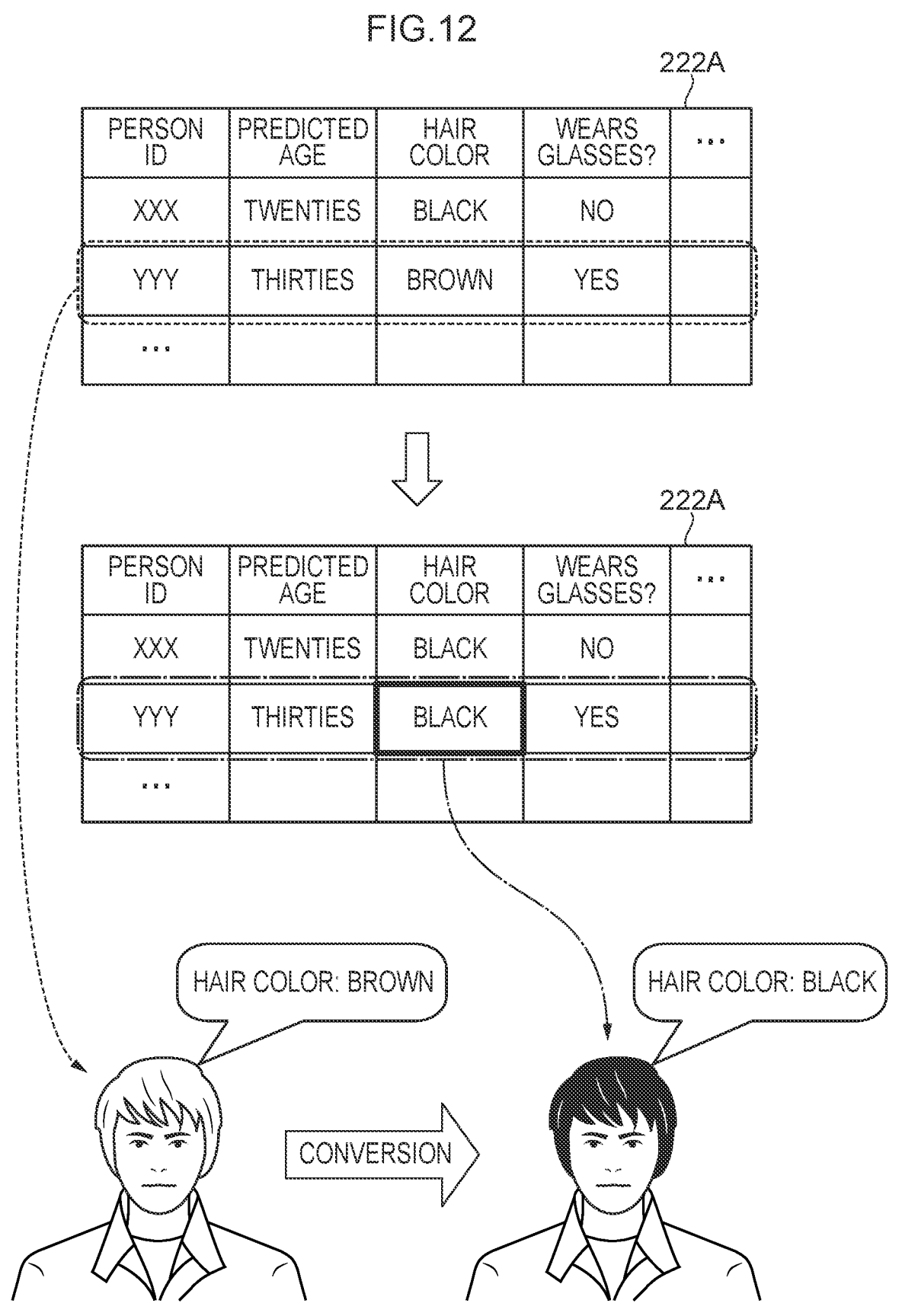

| PERSON ID | PREDICTED AGE | HAIR COLOR | WEARS GLASSES? | ... |
|-----------|---------------|------------|----------------|-----|
| XXX | TWENTIES | BLACK | NO | |
| YYY | THIRTIES | BROWN | YES | |
| ... | | | | |

222A

| PERSON ID | PREDICTED AGE | HAIR COLOR | WEARS GLASSES? | ... |
|-----------|---------------|------------|----------------|-----|
| XXX | TWENTIES | BLACK | NO | |
| YYY | THIRTIES | BLACK | YES | |
| ... | | | | |

HAIR COLOR: BROWN

HAIR COLOR: BLACK

CONVERSION

INPUT IMAGE

ANONYMIZED IMAGE

FIG.16

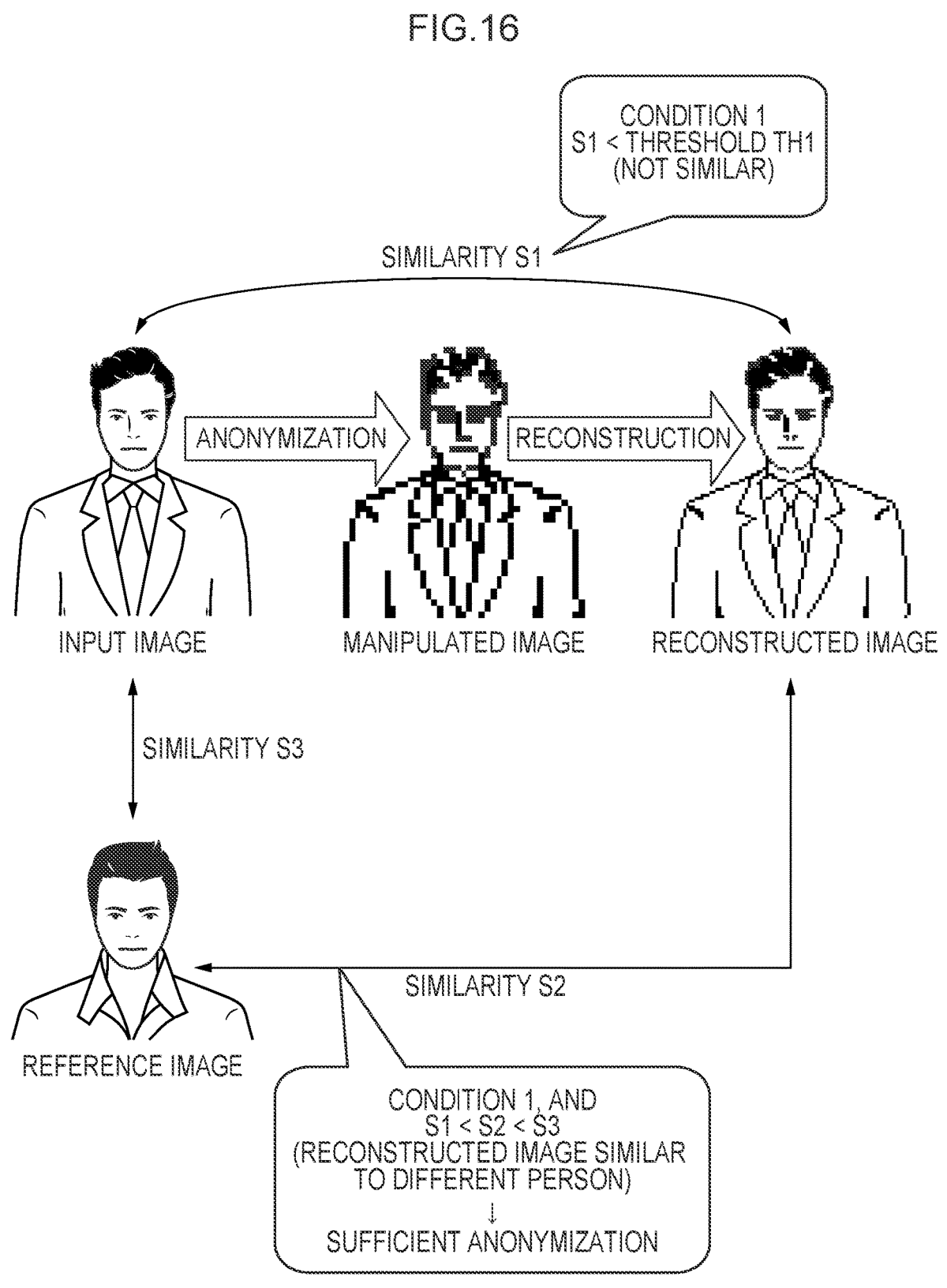

CONDITION 1
S1 < THRESHOLD TH1
(NOT SIMILAR)

SIMILARITY S1

ANONYMIZATION

RECONSTRUCTION

INPUT IMAGE      MANIPULATED IMAGE      RECONSTRUCTED IMAGE

SIMILARITY S3

REFERENCE IMAGE

SIMILARITY S2

CONDITION 1, AND
S1 < S2 < S3
(RECONSTRUCTED IMAGE SIMILAR
TO DIFFERENT PERSON)
↓
SUFFICIENT ANONYMIZATION

IMAGE PROCESSING PROGRAM, DEVICE, AND METHOD FOR ANONYMIZATION AND ADAPTIVE RE-MANIPULATION BASED ON RECONSTRUCTION ANALYSIS

CROSS-REFERENCE TO RELATED APPLICATION

This application is based upon and claims the benefit of priority of the prior Japanese Patent Application No. 2022-124845, filed on Aug. 4, 2022, the entire contents of which are incorporated herein by reference.

FIELD

The embodiments discussed herein are related to an image processing program, an image processing device, and an image processing method.

BACKGROUND

Along with recent developments in signal processing technology, the acquisition according to objective of particular information from images, videos, and the like and the application of such information has become possible. For example, face matching using face image data, extraction of text information from audio, people movement analysis based on videos capturing the manner in which people move, and visualization of congestion states of roads based on videos capturing the manner in which vehicles move are all examples of such application methods.

However, various information is contained in contents such as images and videos. This means that there is a desire to manipulate the contents to a state usable according to objective, while as much as possible excluding information not needed for the objective. In particular, from the perspective of personal information protection, there is a need for technology to remove information such as physical characteristics, faces, and the like so that particular personal information is not able to be acquired from the contents, namely, there is a need for technology to anonymize portions in the contents that are related to personal information.

There is, for example, a proposal for an information sharing assistance device that takes information including personal information, and information such as biological information and purchasing information based on the personal information associated with the personal information related to each individual, and that lets this information be effectively utilized for various objectives by another person while still protecting the personal information. This device generates anonymous information by extracting the personal information from first information including the personal information, and removing or pixelating a portion corresponding to the extracted personal information, or replacing the portion corresponding to the personal information with other information.

Moreover, for example, there is a proposal for an information processing device that anonymizes a person while keeping attribute information of a person included in a person image, thereby enabling analysis to be performed based on the attribute information while protecting the personal information. In this device, based on a person image capturing a person in a shop, a person is detected and also attribute information related to attributes of the person is predicted. In this device, an image of a different person from the person detected from a person image is employed to generate an other-person image including the same attribute information as that of the detected person, so as to anonymize the detected person.

Moreover there is also a proposal, for example, for a device that any freely selected user can use to generate image information enabling a display abstraction level of a privacy protected image to be changed automatically. In this device an area of a processing target object is detected in an image, plural display abstraction levels are presented for object areas, and a single display abstraction level is set from out of the plural display abstraction levels. In this device an abstracted image is generated corresponding to an actual image of an object area based on the single display abstraction level that was set, and then the generated abstracted image is merged with the image.

There is, moreover, a need for technology to evaluate whether contents has been anonymized sufficiently to a level at which personal information is not able to be identified. For example, there is a proposal for a personal information management device that hides personal information capable of identifying a particular person. In this device an output request for target information is acquired, the target information requested by the output request is read, and an identifiability degree that indicates an ease of identification of an individual from the target information is acquired. Moreover, in this device the ease of identification of an individual is employed as a measure, then the identifiability degree is compared against a threshold to demarcate between a set of information from which a particular person might be identified and a set of information from which a particular person is not able to be identified, with manipulation then performed on easy portions where identification of the person in the target information is easy for cases in which the identifiability degree is greater than the threshold. Then in this device, the target information including the post-manipulation easy portion is output as manipulation information instead of the target information.

Moreover, for example, there is also a proposal for an information processing device that computes a value to be employed to compare anonymizations. In this device a pre-anonymization confidence level is computed, which is a confidence level in pre-anonymization data employed in a model that computes confidence level, post-anonymization data is generated by applying an anonymization method to the pre-anonymization data, and an anonymization strength of the anonymization method is computed. In this device a post-anonymization confidence level, which is a confidence level in the post-anonymization data, is also computed using the model, and an evaluation score is computed for the anonymization method based on a difference between the pre-anonymization confidence level and the post-anonymization confidence level, and based on the anonymization strength.

RELATED PATENT DOCUMENTS

Japanese Patent Application Laid-Open (JP-A) No. 2004-145483
JP-A No. 2020-091770
JP-A No. 2017-046196
International Publication (WO) No. 2007/122914
WO No. 2019/168144

SUMMARY

According to an aspect of the embodiments, a non-transitory recording medium stores a program that causes a computer to execute an image processing process. The process includes: generating a manipulated image by executing first manipulation processing on an input image so as to anonymize information contained in the input image; generating a reconstructed image by performing reconstruction processing on the manipulated image to reconstruct the information; and, based on a comparison between the input image and the reconstructed image, determining whether or not to execute second manipulation processing on the input image or on the manipulated image to anonymize the information, wherein the second manipulation processing is different from the first manipulation processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of information of a person area.

FIG. 3 is a diagram illustrating an example of a processing condition DB.

FIG. 4 is a diagram illustrating an example of a processing condition instruction screen.

FIG. 5 is a diagram to explain processing of a determination section in the first exemplary embodiment.

FIG. 6 is a diagram to explain a change in strength of manipulation processing.

FIG. 7 is a block diagram illustrating a schematic configuration of a computer that functions as an image processing device.

FIG. 11 is a diagram illustrating an example of an attribute DB.

FIG. 12 is a diagram to explain a conversion of an image when attribute values are changed.

FIG. 16 is diagram to explain processing of a determination section in a third exemplary embodiment.

DESCRIPTION OF EMBODIMENTS

Description follows regarding an example of an exemplary embodiment according to technology disclosed herein, with reference to the drawings. Note that in each of the following exemplary embodiments, cases are described in which a target for execution of anonymization processing is a face of a person.

First Exemplary Embodiment

Figure 1:
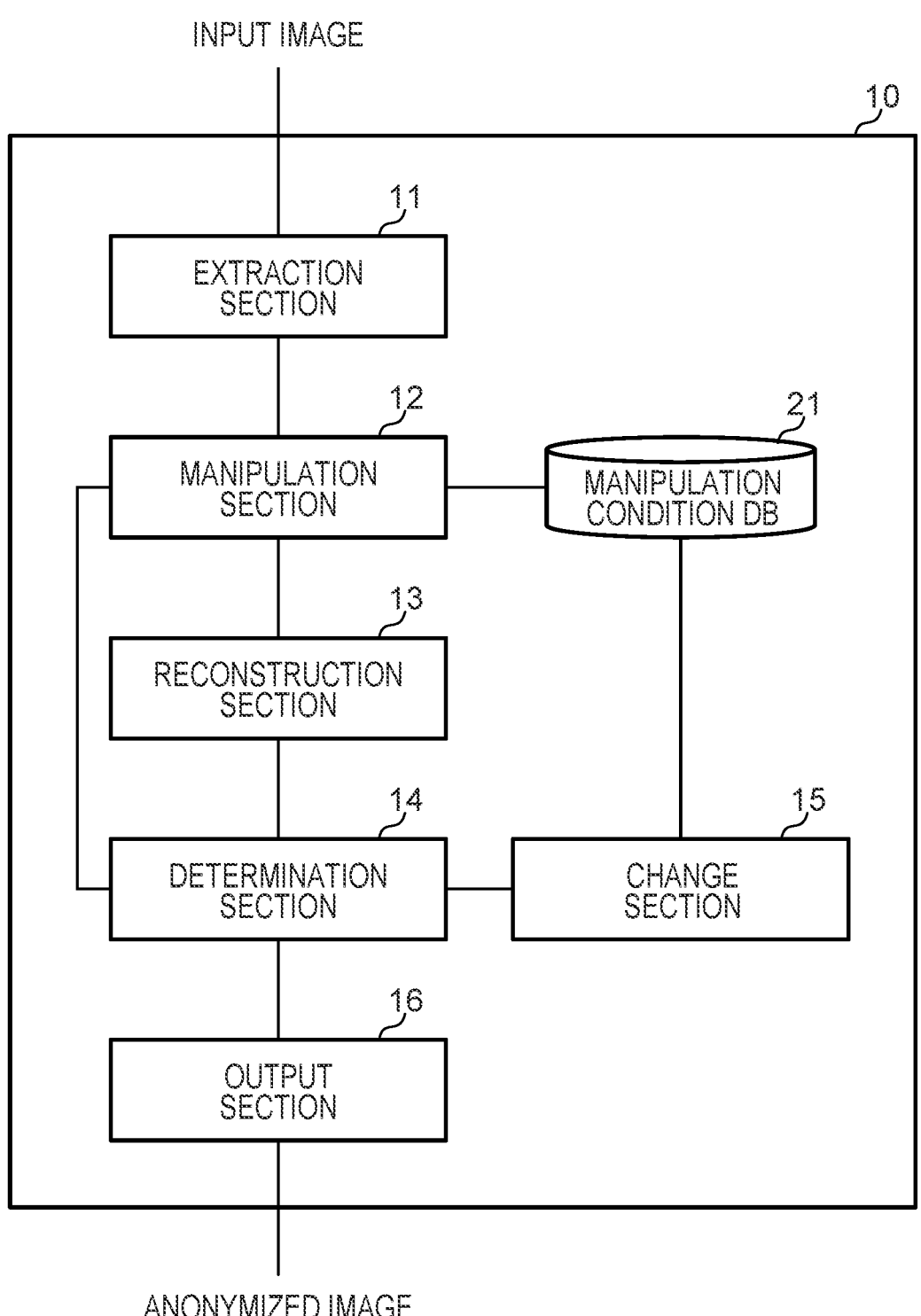
FIG. 1 is a functional block diagram of an image processing device according to a first exemplary embodiment.

FIG. 1 is a functional block diagram of an image processing device 10 according to a first exemplary embodiment. As illustrated in FIG. 1, an input image is input to the image processing device 10. In the present exemplary embodiment an image capturing a person is the input image. The image processing device 10 generates and outputs an anonymized image resulting from performing manipulation processing on the input image to achieve sufficient anonymization to a level at which personal information capable of identifying an individual person not identifiable. The image processing device 10 includes, from a functional perspective, an extraction section 11, a manipulation section 12, a reconstruction section 13, a determination section 14, a change section 15, and an output section 16. A manipulation condition database (DB) 21 is stored in a specific storage area of the image processing device 10.

The extraction section 11 extracts an area including a face of a person (for example, a portion above a chest, hereafter referred to as a "person area") from an input image. A general person detection algorithm may be applied to extract the person area. More specifically, to extract a person area from out of the input image, the extraction section 11 employs, for example, a machine learning model for extracting person areas that was generated in advance by machine learning, and stores information about the extracted person area, such as illustrated in FIG. 2 for example. The example of FIG. 2 indicates an example in which "image ID" that is identification information for an input image, "person ID" that is identification information for a person extracted from the input image, and "area information" that identifies a position of a person area in the input image, are stored. FIG. 2 illustrates an example in which a rectangular area encompassing a target portion of a person is extracted as the person area, and coordinates of an upper left and upper right of the rectangular area in the input image are stored as area information.

Figure 4:
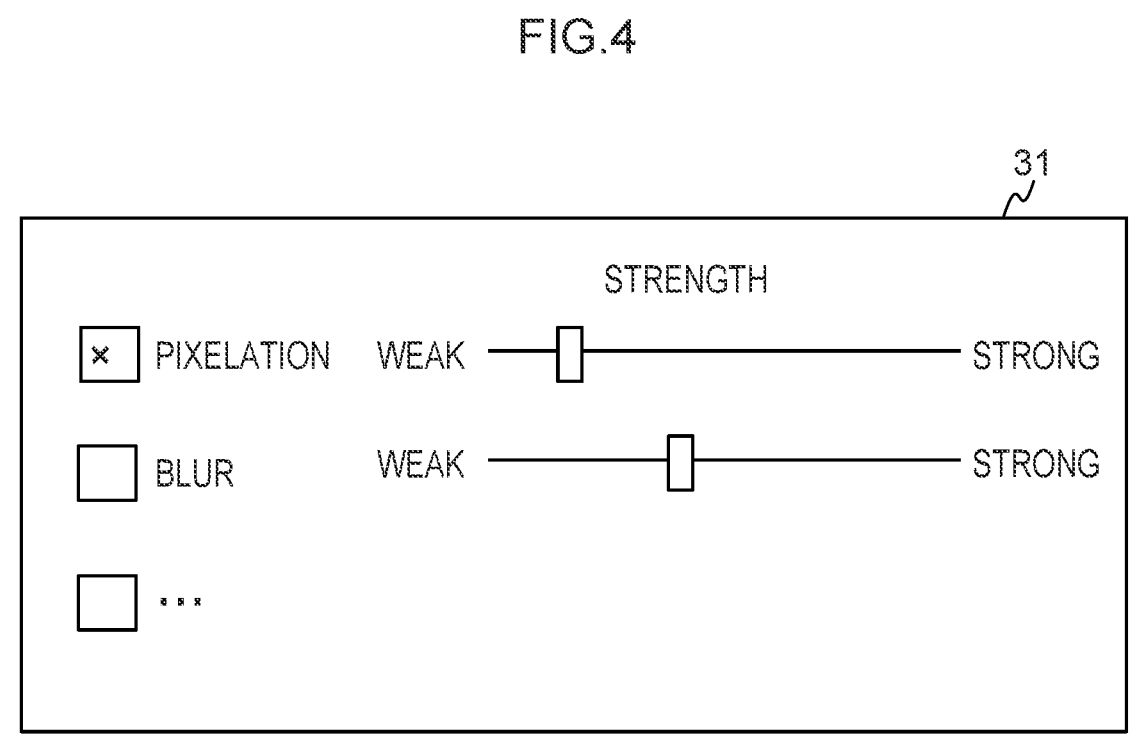

The manipulation section 12 executes manipulation processing on the input image to anonymize the input image and generate a manipulated image. More specifically, the manipulation section 12 executes manipulation processing as instructed by a manipulation condition stored in the manipulation condition DB 21, on the person area in the input image as extracted by the extraction section 11. The manipulation condition DB 21 is, for example as illustrated in FIG. 3, stored with a pre-instructed "manipulation type" to apply, and a "strength" of such manipulation processing. Instruction of the manipulation condition is, for example, instruction by a user performed using a manipulation condition instruction screen 31 such as illustrated in FIG. 4. The manipulation condition instruction screen 31 of FIG. 4 includes check boxes to select whether or not to apply manipulation processing for each type of manipulation, such as pixelation processing, blurring processing, and the like, and also includes a slide bar to instruct a strength for when each of the manipulation processing is applied. The strength of manipulation processing is, for example, a value corresponding to a size of filter applied when applying each manipulation processing.

More specifically, the manipulation section 12 acquires from the extraction section 11 information about the input image and person area, and acquires the manipulation condition from the manipulation condition DB 21. Based on the acquired manipulation condition, the manipulation section 12 executes the manipulation processing such as pixelation processing, blurring processing, and the like on the person area in the acquired input image, so as to generate a manipulated image.

Moreover, in cases in which determination by the determination section 14, described later, is to execute further manipulation processing, the manipulation section 12 executes the further manipulation processing on the input image or on the manipulated image based on a manipulation condition that has been changed by the change section 15, described later. More details are described below, however simply stated, the further manipulation processing is manipulation processing for anonymizing different to the most recently executed manipulation processing and/or is processing that has a strength of blurring processing, pixelation processing, and the like stronger than the most recently executed manipulation processing. Note that the most recently executed manipulation processing is an example of "first manipulation processing" of technology disclosed herein, and the further manipulation processing is an example of "second manipulation processing" of technology disclosed herein.

The reconstruction section 13 executes reconstruction processing on the manipulated image generated by the manipulation section 12 so as to generate a reconstructed image. More specifically, the reconstruction section 13 acquires person area information and a manipulated image from the manipulation section 12, and executes specific reconstruction processing on the person area in the acquired manipulated image so as to generate the reconstructed image. The reconstruction processing may include super-resolution processing, depixelation processing, and the like that employs, for example, a temporally coherent generative adversarial network (TecoGAN, see Reference Document 1), photo upsampling via latent space exploration (PULSE, see Reference Document 2), or the like.

Reference Document 1: "Learning temporal coherence via self-supervision for GAN-based video generation" by M. Chu, et al. published in ACM Transactions on Graphics, Volume 39, Issue 4, August 2020.

Reference Document 2: "PULSE: Self-Supervised Photo Upsampling via Latent Space Exploration of Generative Models" by S. Menon, et al. published in Computer Vision and Pattern Recognition (CVPR) 2020.

The determination section 14 determines whether or not to execute the further manipulation processing on the input image or the manipulated image based on a comparison between the input image and the reconstructed image. More specifically, the determination section 14 extracts feature values in a person area in the input image, and in a person area in the reconstructed image, respectively. The feature values may be feature value resulting from combining pixel values of pixels in an area, or feature values for utilization in face matching or the like. The determination section 14 computes, for example, a cosine similarity between vectors representing the extracted feature values as a similarity $S1$ between the input image and the reconstructed image. The determination section 14 then determines to execute the further manipulation processing in cases in which the similarity $S1$ between the input image and the reconstructed image is a similarity higher than a predetermined threshold $TH1$. For example, as described above, threshold $TH1=0.8$ or the like may be employed for cases in which the similarity $S1$ is a cosine similarity (having values of $-1$ to $1$). As illustrated in FIG. 5, cases in which the similarity $S1<TH1$ indicate that the person reconstructed from the manipulated image is not similar to the person appearing in the input image. Namely, identifying the person appearing in the input image from the reconstructed image is difficult, and this is determined as sufficient anonymization having been executed. In cases in which determination is to execute further manipulation processing, the determination section 14 instructs the manipulation section 12 so as to execute manipulation processing again, but this time based on the manipulation condition DB 21 as changed by the change section 15, described later.

In cases in which determination by the determination section 14 is to execute the further manipulation processing, the change section 15 changes the manipulation condition stored in the manipulation condition DB 21 so as to strengthen the degree of anonymization from the manipulation condition currently stored therein. For example, as illustrated in FIG. 6, in cases in which a strength of the manipulation processing is set as stepwise values, the change section 15 raises the strength of manipulation processing by one step. Moreover, in cases in which the strength of manipulation processing is set as a continuous numerical value that increases as the strength gets stronger, the change section 15 may use a value resulting from adding a specific value to the currently stored strength, a value resulting from multiplying the currently stored strength by a specific multiplier (for example, 1.1 times), or the like. A manipulated image with anonymization further progressed is thereby generated by the manipulation section 12.

In cases in which determination by the determination section 14 is not to execute the further manipulation processing, the output section 16 outputs the most recently generated manipulated image generated by the manipulation section 12 as the anonymized image resulting from anonymizing the input image.

The image processing device 10 may, for example, be realized by a computer 40 as illustrated in FIG. 7. The computer 40 includes a central processing unit (CPU) 41, a memory 42 serving as temporary storage area, and a non-transitory storage device 43. The computer 40 also includes an input/output device 44 such as an input device, a display device, or the like, and a read/write (R/W) device 45 to control reading of data from and writing of data to a storage medium 49. The computer 40 includes a communication interface (I/F) 46 connected to a network such as the internet. The CPU 41, the memory 42, the storage device 43, the input/output device 44, the R/W device 45, and the communication OF 46 are mutually connected together through the bus 47.

The storage device 43 is, for example, a hard disk drive (HDD), solid state drive (SSD), flash memory, or the like. An image processing program 50 to cause the computer 40 to function as the image processing device 10 is stored in the storage device 43 serving as a storage medium. The image processing program 50 includes an extraction process control command 51, a manipulation processing control command 52, a reconstruction process control command 53, a determination process control command 54, a change process control command 55, and an output process control command 56. The storage device 43 includes an information storage area 60 stored with information configuring the manipulation condition DB 21.

The CPU 41 reads the image processing program 50 from the storage device 43, expands the image processing program 50 in the memory 42, and sequentially executes the control commands of the image processing program 50. The CPU 41 operates as the extraction section 11 illustrated in FIG. 1 by executing the extraction process control command 51. The CPU 41 operates as the manipulation section 12 illustrated in FIG. 1 by executing the manipulation processing control command 52. The CPU 41 operates as the reconstruction section 13 illustrated in FIG. 1 by executing the reconstruction process control command 53. The CPU 41 operates as the determination section 14 illustrated in FIG. 1 by executing the determination process control command 54. The CPU 41 operates as the change section 15 illustrated in FIG. 1 by executing the change process control command 55. The CPU 41 operates as the output section 16 illustrated in FIG. 1 by executing the output process control command 56. The CPU 41 reads information from the information storage area 60, and expands the manipulation condition DB 21 in the memory 42. The computer 40 executing the image processing program 50 thereby functions as the image processing device 10. Note that the CPU 41 executing the program is hardware.

Note that functions implemented by the image processing program 50 may, for example, be implemented by a semiconductor integrated circuit, and more specifically an application specific integrated circuit (ASIC), field programmable gate array (FPGA), or the like.

Figure 8:
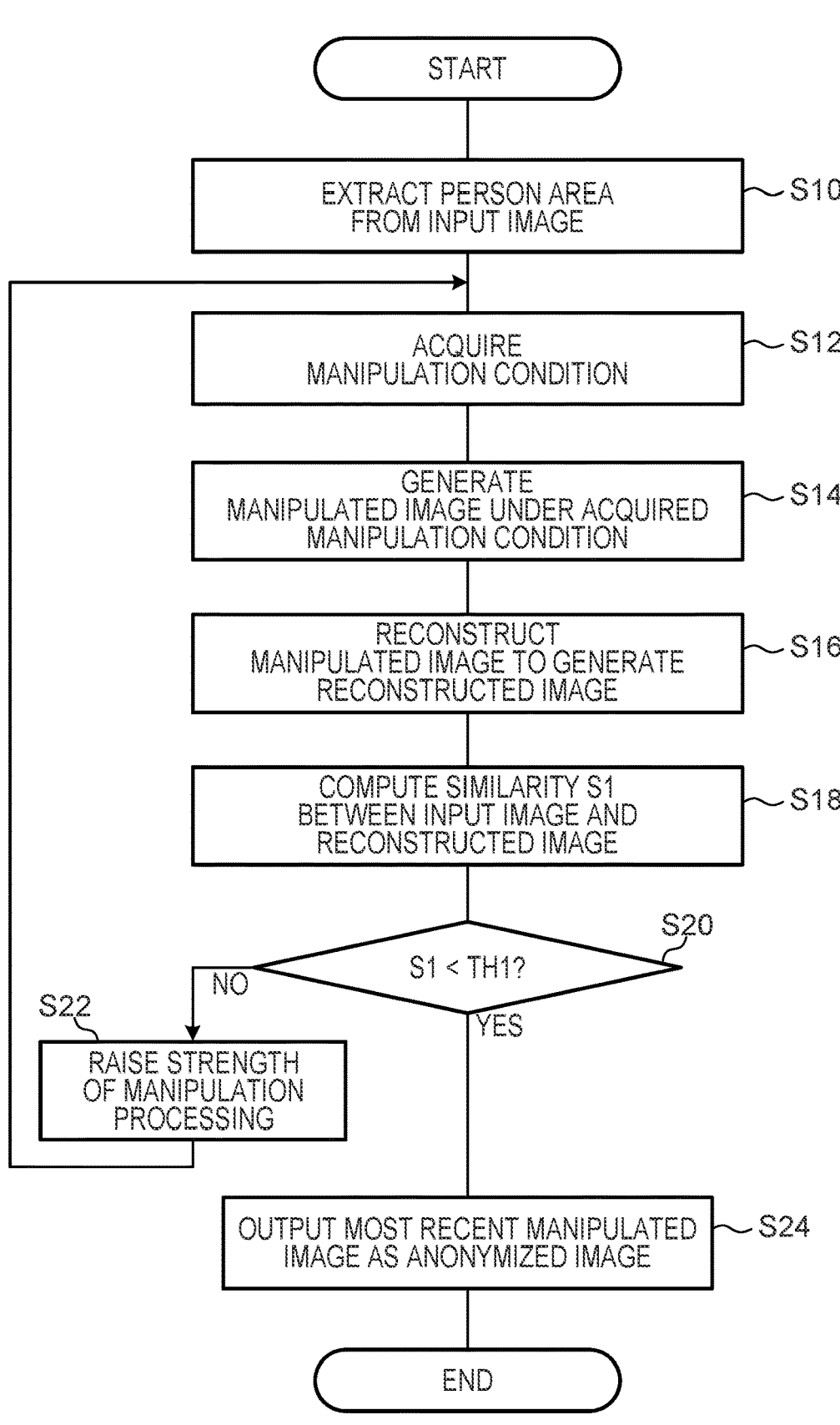
FIG. 8 is a flowchart illustrating an example of image processing according to the first exemplary embodiment.

Next, description follows regarding operation of the image processing device 10 according to the first exemplary embodiment. The image processing illustrated in FIG. 8 is executed in the image processing device 10 when the input image is input to the image processing device 10 and output of an anonymized image is instructed. Note that the image processing is an example of an image processing method of technology disclosed herein.

At step S10 the extraction section 11 acquires the input image input to the image processing device 10, and extracts a person area from the input image. Next, at step S12, the manipulation section 12 acquires a manipulation condition from the manipulation condition DB 21. Next at step S14, based on the acquired manipulation condition, the manipulation section 12 executes manipulation processing such as pixelation processing, blurring processing, or the like on the person area in the input image so as to generate a manipulated image.

Next at step S16, the reconstruction section 13 executes reconstruction processing on the manipulated image generated at step S14, so as to generate the reconstructed image. Next at step S18, the determination section 14 computes the similarity S1 between the input image and the reconstructed image. Next at step S20 the determination section 14 determines whether or not the similarity S1 between the input image and the reconstructed image is smaller than a pre-set threshold TH1. Processing transitions to step S24 when S1<TH1, and processing transitions to step S22 when S1≥TH1.

At step S22 the change section 15 raises the strength of the manipulation condition stored in the manipulation condition DB 21 and processing then returns to step S12. Thereby when next executed a manipulated image generated at step S14 has a stronger degree of anonymization than the manipulated image generated at step S14 the previous time. However, at step S24 the output section 16 outputs the most recent manipulated image generated at the step S14 as an anonymized image resulting from anonymizing the input image, and the image processing is ended.

As described above, in the image processing device according to the first exemplary embodiment, manipulation processing is executed to anonymize the input image and generate the manipulated image, and then a reconstructed image is generated by performing reconstruction processing on the manipulated image. Then based on a comparison between the input image and the reconstructed image, the image processing device determines whether or not to execute further manipulation processing for anonymization that is different to the most recent manipulation processing on either the input image or the manipulated image. This thereby enables sufficient anonymization to be performed to a level at which personal information of a person included in an image is not able to be identified.

Moreover, in the image processing device according to the first exemplary embodiment, scalable anonymization processing can be performed according to content of the contents such as images, videos, or the like, rather than the anonymization processing being decided in advance.

Moreover, the image processing device according to the first exemplary embodiment determines to execute further manipulation processing in cases in which the similarity between the input image and the reconstructed image is a similarity higher than the threshold. This thereby enables anonymization to be performed such that a person reconstructed from the manipulated image is not similar to a person in the input image.

As the further manipulation processing, the image processing device according to the first exemplary embodiment executes processing in which the strength of manipulation processing such as blurring processing, pixelation processing, or the like has been strengthen to more than in the most recent manipulation processing. Repeating the manipulation processing in this manner thereby enables progression to sufficient anonymization at a level such that the personal information of a person contained in an image is no longer identifiable.

Second Exemplary Embodiment

Next, description follows regarding a second exemplary embodiment. Note that the same reference numerals are appended in an image processing device according to a second exemplary embodiment for configuration similar to that of the image processing device 10 according to the first exemplary embodiment, and detailed explanation thereof will be omitted.

Figure 9:
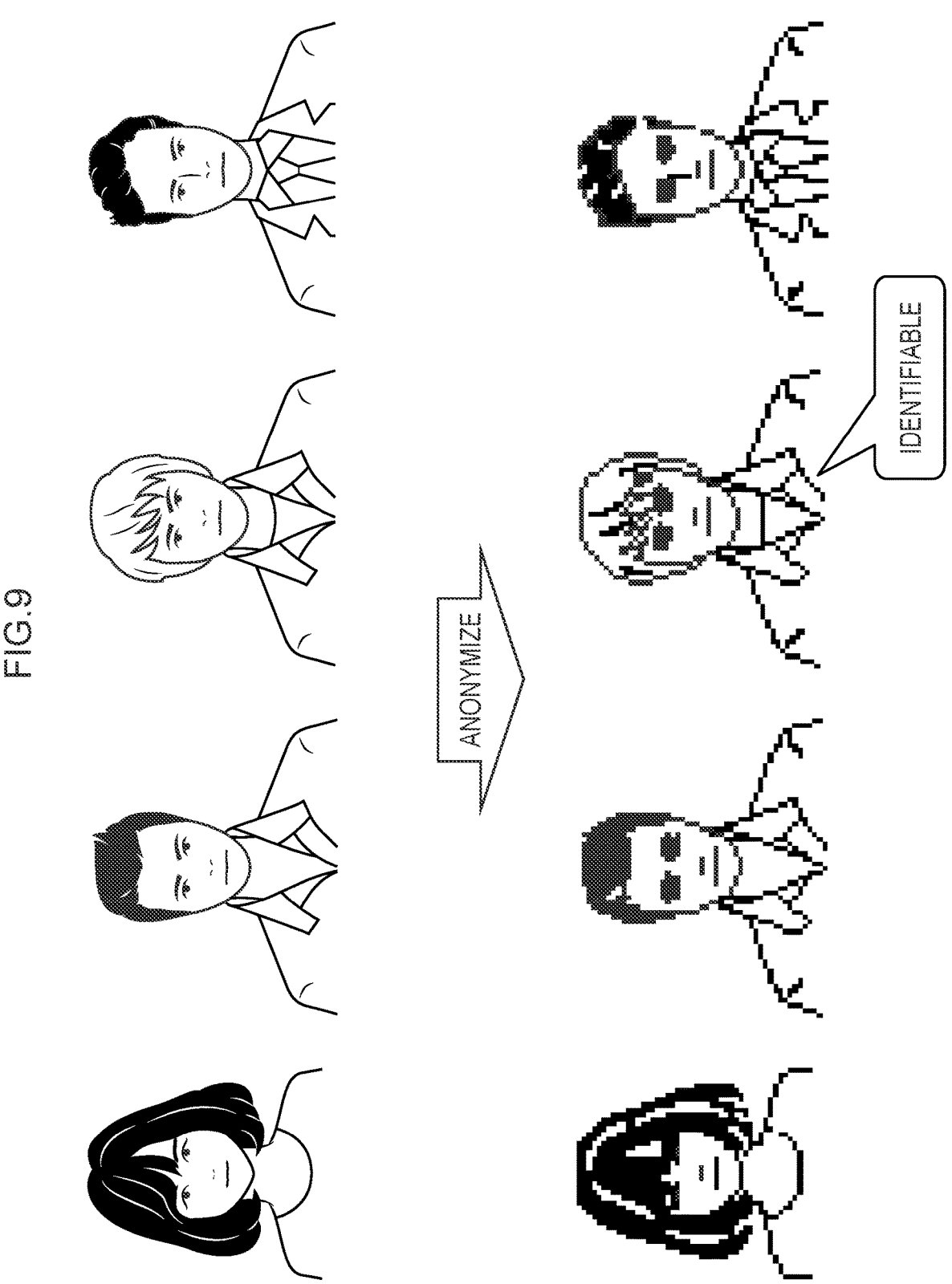
FIG. 9 is a diagram to explain issues with anonymization for cases in which there is bias in attribute information.

In the second exemplary embodiment, whether or not to execute further manipulation processing is determined using attribute information for a person in addition to using the similarity between the manipulated image and the reconstructed image. Consider, as illustrated in FIG. 9, a case in which anonymization is performed on an image capturing a situation in which there is only one person having a different hair color present in a group of plural people. In the example in FIG. 9 there are three people out of four people having black hair, and one person having brown hair. In such cases anonymization is obviously not sufficient, because the person with brown hair is identifiable from the anonymized image. Moreover as anonymization processing, although technology exists to perform processing for replacement with an image of another person having the same attribute information, in cases in which there is a bias in the distribution of the attribute information as illustrated in the example of FIG. 9, the issue of a person with particular attribute information being identifiable from the anonymized image is not able to be resolved.

In order to address this issue, the image processing device according to the second exemplary embodiment determines whether or not to execute further manipulation processing, and executes such manipulation processing for anonymization, based on a distribution of attribute information of a person in contents including plural images. Detailed explanation follows regarding an image processing device according to the second exemplary embodiment.

Figure 10:
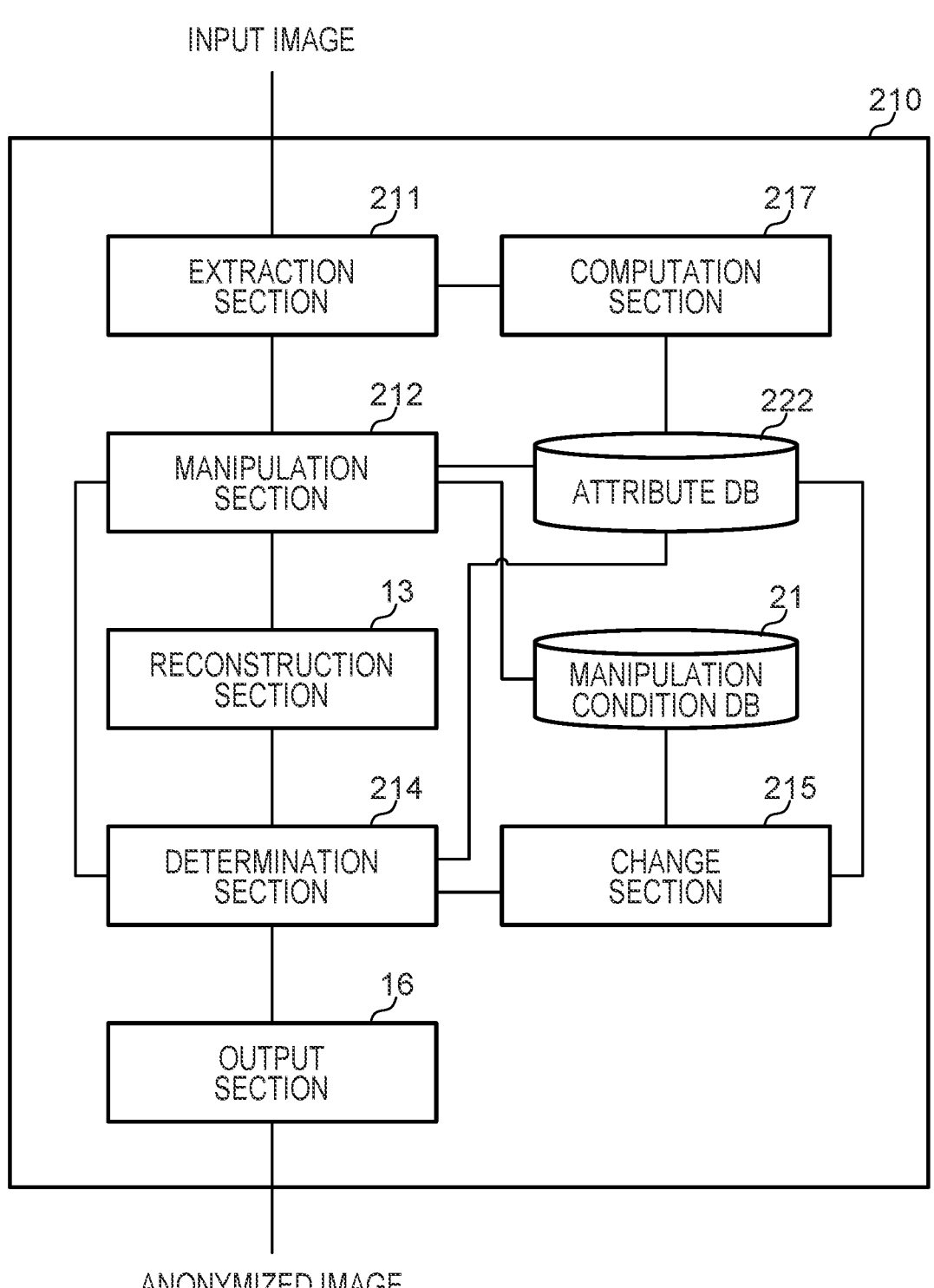
FIG. 10 is a functional block diagram of an image processing device according to a second exemplary embodiment.

FIG. 10 illustrates a functional block diagram of an image processing device 210 according to the second exemplary embodiment. The image processing device 210 includes, from a functional perspective, an extraction section 211, a computation section 217, a manipulation section 212, a reconstruction section 13, a determination section 214, a change section 215, and an output section 16. A manipulation condition DB 21 and an attribute DB 222 are stored in a specific storage area of the image processing device 210.

The extraction section 211 extracts an area of a person from an input image, similarly to the extraction section 11 of the first exemplary embodiment. Furthermore, the extraction section 211 extracts the attribute information of this person from the person area. The attribute information may be gender, age, hair color, wearing/not wearing glasses, or the like. A general attribute information extraction algorithm such as an age predictor, hair style predictor, or the like may be applied in the extraction of attribute information. The extraction section 211 associates the attribute information extracted for each person with a person ID of the person and, for example as illustrated in FIG. 11, stores these in an attribute information table 222A of the attribute DB 222.

The computation section 217 computes a distribution of the attribute information extracted by the extraction section 211. More specifically, the computation section 217 references the attribute information table 222A of the attribute DB 222, and counts the number of instances for each attribute value (correspondence number) in the attribute information. The computation section 217 computes the correspondence number of an attribute value for the number (overall number) of people in the contents as a probability (appearance frequency) for this attribute value. The computation section 217 then stores the probabilities computed for each of the attribute values of the attribute information in, for example, an attribute distribution table 222B of the attribute DB 222 as illustrated in FIG. 11.

The determination section 214, similarly to the determination section 14 of the first exemplary embodiment, determines whether or not to execute further manipulation processing based on the similarity S1 between the input image and the reconstructed image. The determination section 214 also determines whether or not to execute further manipulation processing based on the distribution of the attribute information. For example, referencing the distribution of attribute information for plural people contained in contents enables attribute information having a bias in the distribution of attribute values, such as an extremely low appearance frequency of a single attribute value or the like, to be ascertained. In cases of a biased attribute value distribution, the issue described above arises in that an individual is identifiable in the anonymized image. In order to address this issue, the determination section 214 determines to execute further manipulation processing in cases in which a probability (appearance frequency) of any attribute information of a person subjected to processing is a threshold TH2 or lower.

In cases in which determination is to execute further manipulation processing based on the similarity S1 between the input image and the reconstructed image, the determination section 214 instructs the manipulation section 212 so as to execute manipulation processing again, but this time based on the manipulation condition DB 21 as changed by the change section 215. Also in cases in which execution of further manipulation processing has been determined based on the attribute information distribution, the determination section 214 instructs the manipulation section 212 so as to execute manipulation processing to change the attribute information based on the attribute information table 222A (described in detail later) as changed by the change section 215.

The change section 215, similarly to the change section 15 of the first exemplary embodiment, changes the strength of manipulation processing in the manipulation condition DB 21 so as to be strengthened in cases when determined by the determination section 214 to execute the further manipulation processing based on the similarity S1 between the input image and the reconstructed image.

Furthermore, when determined by the determination section 214 to execute the further manipulation processing based on the attribute information distribution, the change section 215 changes the attribute information of the corresponding person in the attribute information table 222A. More specifically, the change section 215 changes an attribute value in the attribute information of each person for any attribute information that has an attribute value probability (appearance frequency) of TH2 or lower to an attribute value having a probability higher than TH2 in the attribute distribution table 222B. For example, in the example of the attribute distribution table 222B of FIG. 11, the probability of an attribute value "black" for attribute information "hair color" is 90%, and the probability of "brown" is 8%. Suppose that TH2=10%, then the change section 215 would, as illustrated at the top of FIG. 12, extract a person having the attribute value "brown" for attribute information "hair color" in the attribute information table 222A and change the attribute value of the attribute information "hair color" for this person to "black".

When the manipulation condition DB 21 has been changed, the manipulation section 212, similarly to the manipulation section 12 of the first exemplary embodiment, executes manipulation processing such as blurring processing, pixelation processing, or the like based on the post-change strength. When the attribute information table 222A has been changed, the manipulation section 212 also executes manipulation processing to reflect a change to the attribute value of attribute information in the image. More specifically, in the example of FIG. 12, the manipulation section 212 applies a method such as, for example, a StyleGAN or the like to an area of a person having person ID=YYY in the input image so as to convert from brown hair color to black.

The image processing device 210 may, for example, be implemented by the computer 40 illustrated in FIG. 7. An image processing program 250 to cause the computer 40 to function as the image processing device 210 is stored in the storage device 43 of the computer 40. The image processing program 250 includes an extraction process control command 251, a manipulation processing control command 252, a reconstruction process control command 53, a determination process control command 254, a change process control command 255, and an output process control command 56. The image processing program 250 also includes a computation process control command 257. The storage device 43 includes an information storage area 260 stored with information configuring a manipulation condition DB 21 and an attribute DB 222.

The CPU 41 reads the image processing program 250 from the storage device 43, expands the image processing program 250 in the memory 42, and sequentially executes the control commands of the image processing program 250.

The CPU 41 operates as an extraction section 211 illustrated in FIG. 10 by executing the extraction process control command 251. The CPU 41 operates as a manipulation section 212 illustrated in FIG. 10 by executing the manipulation processing control command 252. The CPU 41 operates as a determination section 214 illustrated in FIG. 10 by executing the determination process control command 254. The CPU 41 operates as a change section 215 illustrated in FIG. 10 by executing the change process control command 255. The CPU 41 also operates as a computation section 217 illustrated in FIG. 10 by executing the computation process control command 257. The CPU 41 reads information from the information storage area 260, and expands the manipulation condition DB 21 and the attribute DB 222 in the memory 42. Other control commands are similar to those of the image processing program 50 according to the first exemplary embodiment. The computer 40 executing the image processing program 250 thereby functions as the image processing device 210.

Note that functions implemented by the image processing program 250 may, for example, be implemented by a semiconductor integrated circuit, and more specifically an ASIC, FPGA, or the like.

Figure 13:
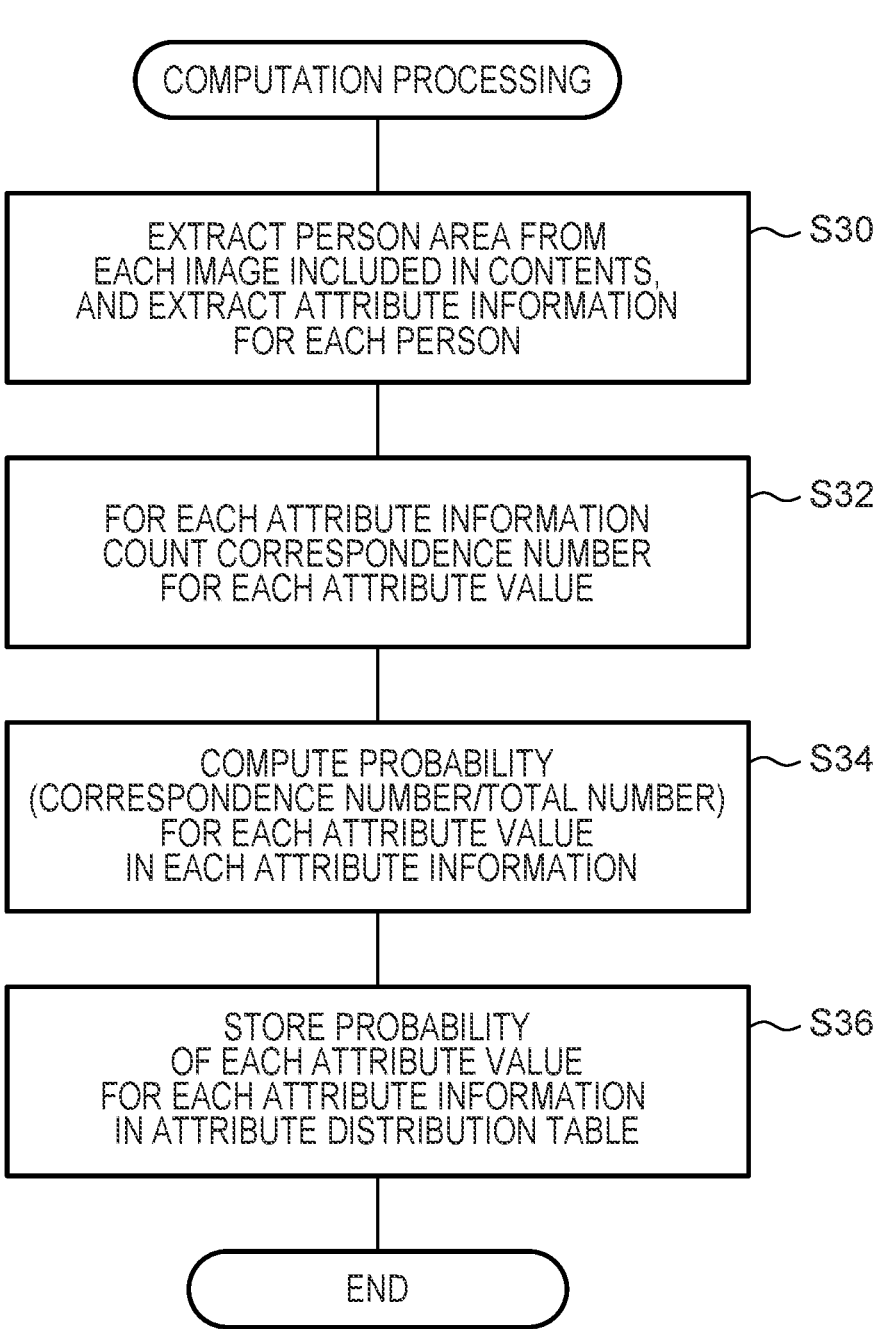
FIG. 13 is a flowchart illustrating an example of computation processing according to the second exemplary embodiment.
Figure 14:
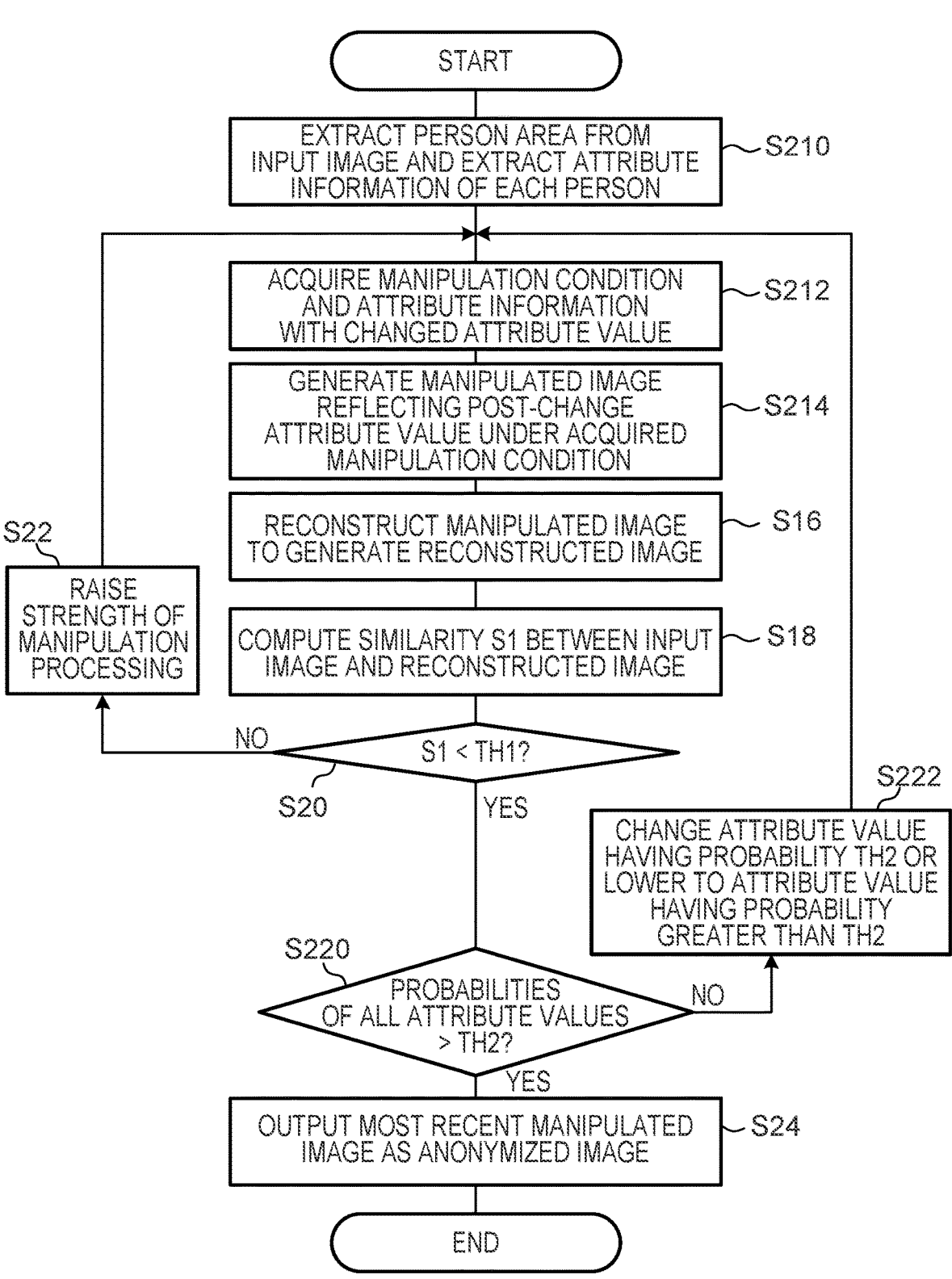
FIG. 14 is a flowchart illustrating an example of image processing according to the second exemplary embodiment.

Next, description follows regarding operation of the image processing device 210 according to the second exemplary embodiment. First, as pre-processing, the computation processing illustrated in FIG. 13 is executed in the image processing device 210 when contents including plural images is input to the image processing device 210. Then the image processing illustrated in FIG. 14 is executed in the image processing device 210 when an input image has been input to the image processing device 210 and output of an anonymized image has been instructed.

First description follows regarding the computation processing, with reference to FIG. 13.

At step S30, the extraction section 211 extracts an area of a person from each of the images included in the contents, and also extracts attribute information of respective people from each of the person areas, and stores these in the attribute information table 222A of the attribute DB 222.

Next, at step S32, the computation section 217 references the attribute information table 222A of the attribute DB 222 and, for each of the attribute information, counts the correspondence number of each attribute value. Next at step S34, the computation section 217 computes the correspondence number of each attribute value for the number (overall number) of people included in the contents as a probability (appearance frequency) for these attribute values. Next at step S36, the computation section 217 stores the computed probabilities for each of the attribute values of the attribute information in the attribute distribution table 222B of the attribute DB 222, and ends the computation processing.

Next, description follows regarding image processing according to the second exemplary embodiment, with reference to FIG. 14. Note that the same step numbers are appended to image processing according to the second exemplary embodiment that is processing the same as in the image processing according to the first exemplary embodiment, and detailed explanation thereof will be omitted.

At step S210, the extraction section 211 extracts a person area from the input image, and also extracts attribute information of this person from the person area. Note that in cases in which a person area and attribute information have already been extracted in the computation processing, this information may be reused.

Next at step S212, the manipulation section 212 acquires a manipulation condition from the manipulation condition DB 21. Moreover, in cases in which any of the attribute values of the attribute information has been changed, the manipulation section 212 acquires the attribute information with the changed attribute value from the attribute information table 222A of the attribute DB 222. Next, at step S214, the manipulation section 212 executes manipulation processing on the person area of the input image to reflect the post-change attribute value, and also executes manipulation processing such as blurring processing, pixelation processing, or the like to generate a manipulated image based on the acquired manipulation condition. Note that manipulation processing such as blurring processing, pixelation processing, or the like may be executed on the input image based on the originally acquired manipulation condition in cases in which the attribute values have not been changed. Moreover, manipulation processing such as blurring processing, pixelation processing, or the like may be executed with the same strength as the previous time in cases in which the strength of the manipulation processing has not been changed.

Next, after passing through step S16 to step S22, processing transitions to step S220 when determined at step S20 that S1<TH1. At step S220, the determination section 214 acquires from the attribute distribution table 222B the probabilities for the attribute values of the attribute information for the people contained in the input image. Then the determination section 214 determines whether or not the probability of all the acquired attribute values is greater than the threshold TH2. Processing transitions to step S24 in cases in which the probability is greater than the threshold TH2 for all the attribute values, and the determination section 214 determines to execute the further manipulation processing when any of the probabilities of the attribute values is TH2 or lower, and processing transitions to step S222.

At step S222, the change section 215 changes an attribute value for given attribute information with an attribute value probability of TH2 or lower in the people attribute information to an attribute value having a probability greater than TH2 in the attribute distribution table 222B, and then processing returns to step S212. Note that in cases in which there are plural attribute values having a probability greater than TH2 in the corresponding attribute information, an attribute value selected at random from out of plural such attribute values may be employed for the post-change attribute value. Then at step S24 the output section 16 outputs the anonymized image, and the image processing is ended.

As described above, the image processing device according to the second exemplary embodiment computes the distribution of attribute information for plural people included in the contents. Then based on the attribute information distribution, the image processing device determines to execute the further manipulation processing in cases in which the probability of an attribute value of attribute information for any person appearing in the input image is a threshold value or lower. Moreover, for the further manipulation processing, the image processing device changes any attribute values for the attribute information having a probability of the threshold TH2 or lower in the person attribute information to an attribute value for which the probability is greater than the threshold TH2 in the attribute information distribution. Adopting such an approach enables sufficient anonymization to be performed to a level at which personal information of a person contained in an image is not identifiable even in cases in which there is a bias in attribute values of attribute information of the people the included in the contents.

Third Exemplary Embodiment

Next description follows regarding a third exemplary embodiment. Note that in the image processing device according to the third exemplary embodiment, the same reference numerals are appended to similar configuration to that of the image processing device 10 according to the first exemplary embodiment, and detailed explanation thereof will be omitted.

Figure 15:
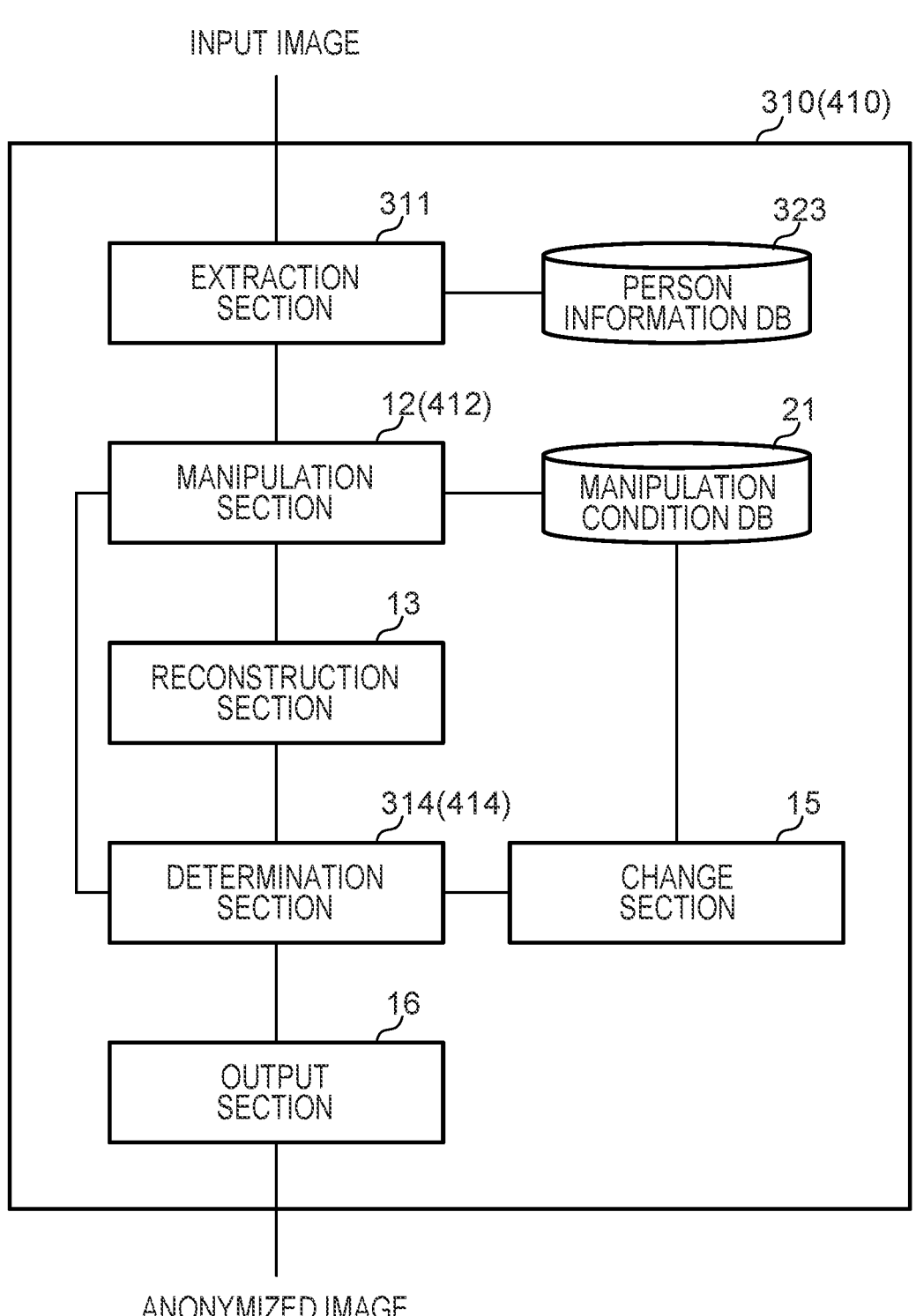
FIG. 15 is a functional block diagram of an image processing device according to a third and fourth exemplary embodiment.

FIG. 15 is a functional block diagram illustrating an image processing device 310 according to the third exemplary embodiment. The image processing device 310 includes, from a functional perspective, an extraction section 311, a manipulation section 12, a reconstruction section 13, a determination section 314, a change section 15, and an output section 16. Moreover, a manipulation condition DB 21 and a person information DB 323 are stored in a specific storage area of the image processing device 310.

When an input image is acquired, the extraction section 311 acquires, from the person information DB 323, a reference image capturing a person different to the person appearing in the input image. The person appearing in the input image and the different person are preferably similar to each other. Images capturing the people, and respective feature values extracted from these images, are stored associated with each other in the person information DB 323. The extraction section 311 applies general technology for similar image searching to acquire images similar to the input image as a reference image from the person information DB 323. The extraction section 311 extracts a person area from each of the input image and the reference image.

The determination section 314 computes a similarity S1 between the input image and the reconstructed image, a similarity S2 between the reconstructed image and the reference image, and a similarity S3 between the input image and the reference image. The method for computing each of the similarities may be similar to the method of computing the similarity S1 by the determination section 14 in the first exemplary embodiment. As illustrated in FIG. 16, the determination section 314 determines not to execute further manipulation processing in cases in which the similarity S1 is less than the threshold TH1 (for example, 0.5), and also S1<S2<S3. These conditions indicate that the person reconstructed from the manipulated image is not similar to the person appearing in the input image, and in addition thereto, the reconstructed person is also more similar to a different person than to the person appearing in the input image. Namely, the person appearing in the input image is difficult to identify from the reconstructed image, and determination is that sufficient anonymization has been executed.

The image processing device 310 may, for example, be realized by the computer 40 illustrated in FIG. 7. An image processing program 350 to cause the computer 40 to function as the image processing device 310 is stored in the storage device 43 of the computer 40. The image processing program 350 includes an extraction process control command 351, a manipulation processing control command 52, a reconstruction process control command 53, a determination process control command 354, a change process control command 55, and an output process control command 56. The storage device 43 includes an information storage area 360 where information configuring each of a manipulation condition DB 21 and a person information DB 323 is stored.

The CPU 41 reads the image processing program 350 from the storage device 43, expands the image processing program 350 into the memory 42, and sequentially executes the control commands of the image processing program 350. The CPU 41 operates as the extraction section 311 illustrated in FIG. 15 by executing the extraction process control command 351. Moreover, the CPU 41 operates as the determination section 314 illustrated in FIG. 15 by executing the determination process control command 354. The CPU 41 also reads information from the information storage area 360, and expands each of the manipulation condition DB 21 and the person information DB 323 into the memory 42. Other control commands are similar to those of the image processing program 50 according to the first exemplary embodiment. The computer 40 executing the image processing program 350 thereby functions as the image processing device 310.

Note that functions implemented by the image processing program 350 may, for example, be implemented by a semiconductor integrated circuit, and more specifically an ASIC, FPGA, or the like.

Figure 17:
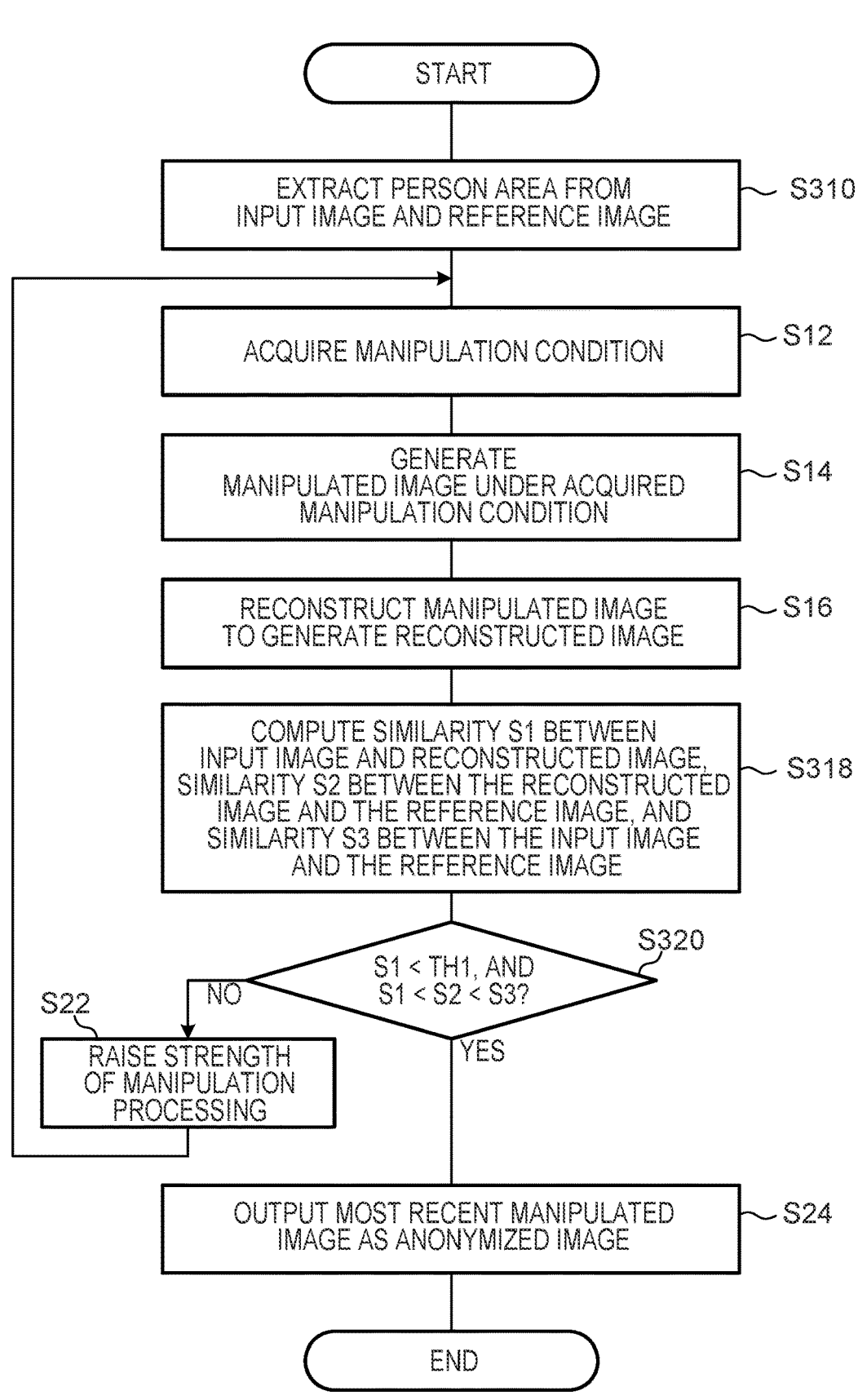
FIG. 17 is a flowchart illustrating an example of image processing according to the third exemplary embodiment.

Next, description follows regarding operation of the image processing device 310 according to the third exemplary embodiment. The image processing device 310 executes the image processing illustrated in FIG. 17 when an input image is input to the image processing device 310 and output of an anonymized image is instructed. Note that in the image processing according to the third exemplary embodiment the same step numbers are appended to the same processing as that of the image processing according to the first exemplary embodiment, and detailed explanation thereof will be omitted.

At step S310, the extraction section 311 acquires the input image input to the image processing device 310, acquires the reference image similar to the input image from the person information DB 323, and extracts person areas from the input image and the reference image, respectively. Next, after passing through step S12 to step S16, at step S318 the determination section 314 computes the similarity S1 between the input image and the reconstructed image, the similarity S2 between the reconstructed image and the reference image, and the similarity S3 between the input image and the reference image.

Next at step S320 the determination section 314 determines whether or not S1<TH1, and also S1<S2<S3. Processing transitions to step S24 when affirmative determination is made, and processing transitions to step S22 when negative determination is made.

As described above, to determine whether or not to execute further manipulation processing, the image processing device according to the third exemplary embodiment employs the similarity between the input image and the reconstructed image, and in addition thereto employs the similarities between the reference image and both the reconstructed image and the input image. This thereby enables a more strict determination of a difficulty of identifying an individual from the reconstructed image, and enables even more sufficient anonymization to be executed.

Fourth Exemplary Embodiment

Next description follows regarding a fourth exemplary embodiment. Note that in the image processing device according to the fourth exemplary embodiment the same reference numerals are appended to similar configuration to that of the image processing device 310 according to the third exemplary embodiment, and detailed explanation thereof will be omitted.

FIG. 15 is a functional block diagram illustrating an image processing device 410 according to the fourth exemplary embodiment. The image processing device 410 includes, from a functional perspective, an extraction section 311, a manipulation section 412, a reconstruction section 13, a determination section 414, a change section 15, and an output section 16. Moreover, a manipulation condition DB 21 and a person information DB 323 are stored in a specific storage area of the image processing device 410.

The manipulation section 412 executes manipulation processing on an input image so as to generate a manipulated image, and executes similar manipulation processing also on a reference image to generate a reference manipulated image.

Figure 18:
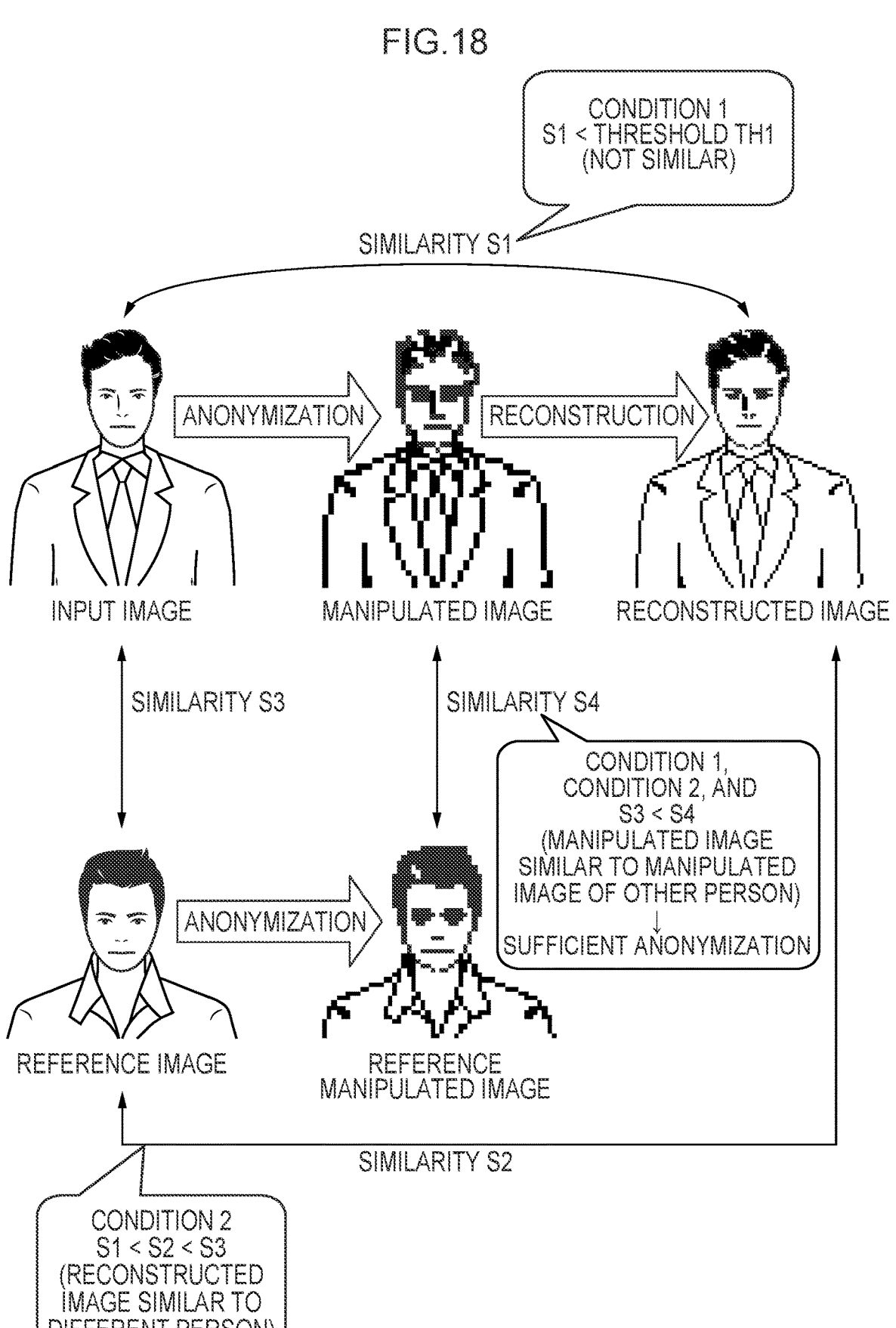
FIG. 18 is a diagram to explain processing of a determination section in a fourth exemplary embodiment.

The determination section 414 computes a similarity S1 between the input image and the reconstructed image, a similarity S2 between the reconstructed image and the reference image, a similarity S3 between the input image and the reference image, and a similarity S4 between the manipulated image and the reference manipulated image. The method of computing each of the similarities may be similar to the method employed by the determination section 14 in the first exemplary embodiment to compute the similarity S1. As illustrated in FIG. 18, the determination section 414 determines not to execute the further manipulation processing in cases in which: the similarity S1 is less than threshold TH1 (for example, 0.5); S1<S2<S3; and S3<S4. Thereby in addition to the determination conditions for the determination section 314 of the third exemplary embodiment, determination that sufficient anonymization has been executed is made when both the manipulated image is similar to the manipulated image of a different person and discrimination from the different person is difficult in the manipulated images.

The image processing device 410 may, for example, be implemented by the computer 40 illustrated in FIG. 7. An image processing program 450 to cause the computer 40 to function as the image processing device 410 is stored in the storage device 43 of the computer 40. The image processing program 450 includes an extraction process control command 351, a manipulation processing control command 452, a reconstruction process control command 53, a determination process control command 454, a change process control command 55, and an output process control command 56. The storage device 43 includes an information storage area 360 stored with information configuring each of a manipulation condition DB 21 and a person information DB 323.

The CPU 41 reads the image processing program 450 from the storage device 43, expands the image processing program 450 into the memory 42, and sequentially executes the control commands of the image processing program 450. The CPU 41 operates as the manipulation section 412 illustrated in FIG. 15 by executing the manipulation processing control command 452. The CPU 41 operates as the determination section 414 illustrated in FIG. 15 by executing the determination process control command 454. Other control commands are similar to those of the image processing program 350 according to the third exemplary embodiment. Thus the computer 40 executing the image processing program 450 thereby functions as the image processing device 410.

Note that the functions implemented by the image processing program 450 may, for example, be implemented by a semiconductor integrated circuit, and more specifically an ASIC, FPGA, or the like.

Figure 19:
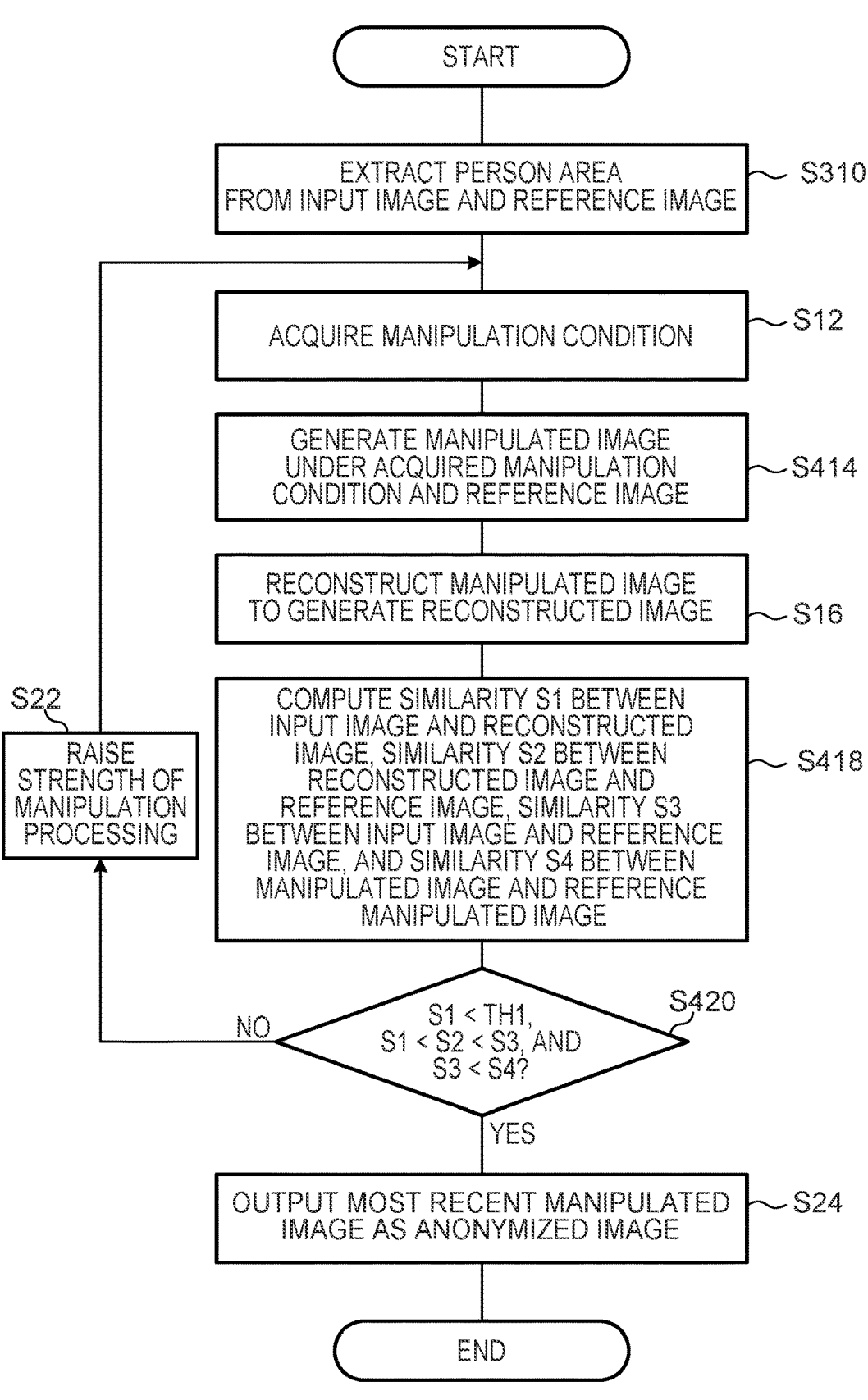
FIG. 19 is a flowchart illustrating an example of image processing according to a fourth exemplary embodiment.

Next, description follows regarding operation of the image processing device 410 according to the fourth exemplary embodiment. The image processing device 410 executes the image processing illustrated in FIG. 19 when an input image is input to the image processing device 410 and output of an anonymized image is instructed. Note that in the image processing according to the fourth exemplary embodiment, the same step numbers are appended to the same processing as that of the image processing according to the third exemplary embodiment, and detailed explanation thereof will be omitted.

After passing through step S310 and step S12, at the next step S414 the manipulation section 412 executes manipulation processing respectively on the input image and the reference image based on the acquired manipulation condition, and respectively generates a manipulated image and a reference manipulated image.

Next after passing through step S16, at the next step S418 the determination section 414 computes a similarity S1 between the input image and the reconstructed image, a similarity S2 between the reconstructed image and the reference image, a similarity S3 between the input image and the reference image, and a similarity S4 between the manipulated image and the reference manipulated image.

Next, at step S420 the determination section 414 determines whether or not: S1<TH1 and S1<S2<S3 and S3<S4. Processing transitions to step S24 when affirmative determination is made, and processing transitions to step S22 when negative determination is made.

As described above, in addition to employing the similarity between the input image and the reconstructed image, and the similarity between the reference image and both the reconstructed image and the input image, to determine whether or not to execute further manipulation processing, the image processing device according to the fourth exemplary embodiment also employs the similarity between the manipulated image and the reference manipulated image therefor. This thereby enables more strict determination of difficulty of discriminating from the different person in the manipulated image, and enables execution of more sufficient anonymization.

Note that similarly to in the second exemplary embodiment, in the third exemplary embodiment and the fourth exemplary embodiment too processing to determine whether or not to execute the further manipulation processing may be executed in combination with determination based on the distribution of attribute information.

Moreover, although in the second exemplary embodiment a case was described in which determination based on the similarity between the input image and the reconstructed image, and determination based on the attribute information distribution are combined, the determined based on the attribute information distribution may be executed on its own. In such cases, the image processing device acquires the attribute information of a person appearing in the input image, and computes a distribution of attribute values for each attribute information for the plural people acquired from plural images. The image processing device determines whether or not a probability of an attribute value of attribute information in the attribute information attribute value distribution is a threshold or lower for any of the people appearing in the input image. Then in cases in which the probability of any of the attribute values is the threshold or lower, the image processing device may be configured so as to execute manipulation processing including processing to change such an attribute value to an attribute value having a probability greater than the threshold in the attribute information attribute value distribution.

Moreover, as one type of manipulation processing, processing may be executed as processing to change the attribute value of the attribute information without reference to the attribute information distribution. The manipulation processing in such cases may, for example, be processing to select attribute information at random from attribute information of a person, and to change the selected attribute information attribute value to another attribute value. In such cases the strength of manipulation processing may be raised by increasing the number of items of attribute information for which attribute values are changed when determined that further manipulation processing should be executed.

Moreover, although each of the above exemplary embodiments cases were described for cases in which the anonymization was progressed by raising the strength of pixelation processing, blurring processing, or the like, there is no limitation thereto. For example, in cases in which only blurring processing was instructed as the initial manipulation processing, when determined that further manipulation processing should be executed, the further manipulation processing may be executed by executing pixelation processing either instead of blurring processing or in addition to blurring processing.

The above exemplary embodiments may be utilized in usage cases such as the following.

For example, a case in which a video from a drive recorder installed to a vehicle such as a taxi is anonymized and then utilized as training data to train a machine learning model for autonomous driving. By executing sufficient anonymization such as in the above exemplary embodiments, a video can be generated in which any people such as pedestrians appearing in the drive recorder video will be obvious as people, but information has been removed that would enable individuals to be identified, such as their faces. Namely, a video is able to be generated in which individuals are not able to be identified, while still being a video that fulfils the objective of being utilized as training data to train a machine learning model for autonomous driving.

Moreover, the above exemplary embodiments are also applicable to, for example, cases in which information enabling an individual to be guessed, such as the appearance, features, or the like of an individual, are removed from an interview video so as to convert the video into a video from which individuals are not able to be identified.

Moreover, although cases in which the processing target object is the face of a person have been described in the above exemplary embodiments, there is no limitation thereto. For example, the body of the person may be the target object. In such cases, the clothes, build, or the like of the person may be used as person attribute information. Moreover, the target object is not limited to being a person, and application may be made to vehicles or the like. In such cases, vehicle model, license number, color, and the like may be extracted as vehicle attribute information, in a configuration such that sufficient anonymization is executed thereon so that vehicles are not individually identifiable from the attribute information thereof.

Moreover, although in the above exemplary embodiment the image processing program is pre-stored (installed) in a storage device, there is no limitation thereto. The program accordingly to the technology disclosed herein may be provided in a format stored on a storage medium such as a CD-ROM, DVD-ROM, USB memory, or the like.

A strength of anonymization needed differs depending on the contents, and even when anonymization has been performed under a specific condition, performing sufficient anonymization for all contents is difficult. A conceivable approach to address this would be to perform repeated anonymization until sufficient anonymization has been achieved. For example, for a face image anonymized under a specific condition, conceivably anonymization may be performed again with a change to the condition in cases in which an individual has been identified by application of face matching technology.

However as in related technology, sometimes it is difficult to determine whether or not sufficient anonymization has been performed using an identifiability degree that indicates an ease of identification of an individual, and an index such as an evaluation value of an anonymization method based on a difference between a pre-anonymization confidence level and a post-anonymization confidence level and based on an anonymization strength. More specifically, related technology does not consider recently developed advances in cases in which an anonymized image is reconstructed using image reconstruction, image super-resolution technology, and the like, with this meaning that sometimes anonymization is determined as being sufficient even though sufficient anonymization has not been performed.

The technology disclosed herein enables sufficient anonymization to be performed to a level at which a target object included in an image is unable to be identified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a program that causes a computer to execute an image processing process, the process comprising:

generating a manipulated image by executing first manipulation processing on an input image so as to anonymize information contained in the input image;

generating a reconstructed image by performing reconstruction processing on the manipulated image to reconstruct the information; and, based on a comparison between the input image and the reconstructed image, determining whether or not to execute second manipulation processing on the input image or on the manipulated image to anonymize the information, wherein the second manipulation processing is different from the first manipulation processing;

executing the second manipulation processing on the input image or on the manipulated image when it has been determined to execute the second manipulation processing; and outputting the manipulated image generated most recently in a case in which it has been determined to not execute the second manipulation processing, wherein processing to determine whether or not to execute the second manipulation processing includes determining to execute the second manipulation processing in a case in which a first similarity between the input image and the reconstructed image indicates a higher similarity than a first threshold;

the process further comprising:

extracting attribute information of a target object appearing in the input image; and extracting attribute information for each of a plurality of target objects from a plurality of images, and computing a distribution of attribute values of the attribute information for the plurality of images, wherein processing to determine whether or not to execute the second manipulation processing includes determining to execute the second manipulation processing in a case in which an appearance frequency of attribute values of attribute information for any target object appearing in the input image is a second threshold or lower in the distribution of attribute values of the attribute information.

2. The non-transitory recording medium of claim 1, wherein the second manipulation processing includes processing to change an attribute value of attribute information for which the appearance frequency of the attribute value is the second threshold or lower in the attribute information of a target object appearing in the input image to an attribute value having an attribute value appearance frequency greater than the second threshold in the attribute information distribution.

3. The non-transitory recording medium of claim 1, wherein the processing to determine whether or not to execute the second manipulation processing includes determining not to execute the second manipulation processing in a case in which conditions are satisfied:

the first similarity is the first threshold or lower;

the first similarity is lower than a second similarity between the reconstructed image and a reference image capturing a different target object from the target object appearing in the input image; and the second similarity is lower than a third similarity between the input image and the reference image.

4. The non-transitory recording medium of claim 3, wherein the processing to determine whether or not to execute the second manipulation processing includes determining not to execute the second manipulation processing in a case in which:

the third similarity is lower than a fourth similarity between the manipulated image and a reference manipulated image resulting from executing the first manipulation processing on the reference image.

5. The non-transitory recording medium of claim 1, wherein the first manipulation processing includes at least one type of processing on a particular area of the input image selected from the group consisting of blurring processing, pixelation processing, and processing to change an attribute value of at least one attribute information of a target object appearing in the input image.

6. The non-transitory recording medium of claim 5, wherein the second manipulation processing is:

processing to strengthening the blurring processing or the pixelation processing to stronger than in the first manipulation processing;

processing to increase a number items of attribute information for which an attribute value is changed to more than in the first manipulation processing; or a combination thereof.

7. The non-transitory recording medium of claim 1, wherein the reconstruction processing is super-resolution processing or depixelation processing performed on the manipulated image.

8. An image processing device comprising:

a memory; and a processor coupled to the memory, the processor being configured to execute processing, the processing including:

generating a manipulated image by executing first manipulation processing on an input image so as to anonymize information contained in the input image;

generating a reconstructed image by performing reconstruction processing on the manipulated image to reconstruct the information; and, based on a comparison between the input image and the reconstructed image, determining whether or not to execute second manipulation processing on the input image or on the manipulated image to anonymize the information, wherein the second manipulation processing is different from the first manipulation processing;

executing the second manipulation processing on the input image or on the manipulated image when it has been determined to execute the second manipulation processing; and outputting the manipulated image generated most recently in a case in which it has been determined to not execute the second manipulation processing, wherein processing to determine whether or not to execute the second manipulation processing includes determining to execute the second manipulation processing in a case in which a first similarity between the input image and the reconstructed image indicates a higher similarity than a first threshold;

the processing further comprising:

extracting attribute information of a target object appearing in the input image; and extracting attribute information for each of a plurality of target objects from a plurality of images, and computing a distribution of attribute values of the attribute information for the plurality of images, wherein processing to determine whether or not to execute the second manipulation processing includes determining to execute the second manipulation processing in a case in which an appearance frequency of attribute values of attribute information for any target object appearing in the input image is a second threshold or lower in the distribution of attribute values of the attribute information.

9. The image processing device of claim 8, wherein the second manipulation processing includes processing to change an attribute value of attribute information for which the appearance frequency of the attribute value is the second threshold or lower in the attribute information of a target object appearing in the input image to an attribute value having an attribute value appearance frequency greater than the second threshold in the attribute information distribution.

10. The image processing device of claim 8, wherein the processing to determine whether or not to execute the second manipulation processing includes determining not to execute the second manipulation processing in a case in which all conditions are satisfied:

the first similarity is the first threshold or lower;

the first similarity is lower than a second similarity between the reconstructed image and a reference image capturing a different target object from the target object appearing in the input image; and the second similarity is lower than a third similarity between the input image and the reference image.

11. The image processing device of claim 10, wherein the processing to determine whether or not to execute the second manipulation processing includes determining not to execute the second manipulation processing in a case in which:

the third similarity is lower than a fourth similarity between the manipulated image and a reference manipulated image resulting from executing the first manipulation processing on the reference image.

12. The image processing device of claim 8, wherein the first manipulation processing includes at least one type of processing on a particular area of the input image selected from the group consisting of blurring processing, pixelation processing, and processing to change an attribute value of at least one attribute information of a target object appearing in the input image.

13. The image processing device of claim 12, wherein the second manipulation processing is:

processing to strengthening the blurring processing or the pixelation processing to stronger than in the first manipulation processing;

processing to increase a number items of attribute information for which an attribute value is changed to more than in the first manipulation processing; or a combination thereof.

14. The image processing device of claim 8, wherein the reconstruction processing is super-resolution processing or depixelation processing performed on the manipulated image.

15. An image processing method comprising:

generating a manipulated image by executing first manipulation processing on an input image so as to anonymize information contained in the input image;

generating a reconstructed image by performing reconstruction processing on the manipulated image to reconstruct the information; and by a processor and based on a comparison between the input image and the reconstructed image, determining whether or not to execute second manipulation processing on the input image or on the manipulated image to anonymize the information, wherein the second manipulation processing is different from the first manipulation processing;

executing the second manipulation processing on the input image or on the manipulated image when it has been determined to execute the second manipulation processing; and outputting the manipulated image generated most recently in a case in which it has been determined to not execute the second manipulation processing, wherein processing to determine whether or not to execute the second manipulation processing includes determining to execute the second manipulation processing in a case in which a first similarity between the input image and the reconstructed image indicates a higher similarity than a first threshold;

the method further comprising:

extracting attribute information of a target object appearing in the input image; and extracting attribute information for each of a plurality of target objects from a plurality of images, and computing a distribution of attribute values of the attribute information for the plurality of images, wherein processing to determine whether or not to execute the second manipulation processing includes determining to execute the second manipulation processing in a case in which an appearance frequency of attribute values of attribute information for any target object appearing in the input image is a second threshold or lower in the distribution of attribute values of the attribute information.

* * * * *